US007778842B2

(12) United States Patent
Apple et al.

(10) Patent No.: US 7,778,842 B2

(45) Date of Patent: *Aug. 17, 2010

(54) MEDIA WALL FOR DISPLAYING FINANCIAL INFORMATION

(75) Inventors: Thomas Apple, Arlington, VA (US); Paul Noble, Short Hills, NJ (US); John Footen, Mt. Arlington, NJ (US); Andrew Klein, Brookline, MA (US)

(73) Assignee: The NASDAQ OMX Group, Inc., Rockville, MD (US)

(*) Notice: Subject to any disclaimer, the term of this patent is extended or adjusted under 35 U.S.C. 154(b) by 128 days.

This patent is subject to a terminal disclaimer.

(21) Appl. No.: 11/300,774

(22) Filed: Dec. 15, 2005 (Under 37 CFR 1.47)

(65) Prior Publication Data

US 2006/0095360 A1 May 4, 2006

(51) Int. Cl.
*G06Q 30/00* (2006.01)

(52) U.S. Cl. .............................. 705/1; 705/10; 705/35; 705/37; 340/825.26; 340/825.27; 345/1.3; 345/56; 345/57; 345/502

(58) Field of Classification Search .................. 345/56, 345/57
See application file for complete search history.

(56) References Cited

U.S. PATENT DOCUMENTS

| | | | | |
|---|---|---|---|---|
| 3,387,268 A | | 6/1968 | Epstein | |
| 3,651,511 A | | 3/1972 | Andrews et al. | |
| 5,245,324 A | | 9/1993 | Jonker et al. | |
| 5,253,067 A | | 10/1993 | Chaney et al. | |
| 5,270,922 A | * | 12/1993 | Higgins | 705/37 |
| 5,319,382 A | | 6/1994 | Fitzpatrick et al. | |
| 5,339,392 A | * | 8/1994 | Risberg et al. | 715/762 |
| 5,523,769 A | | 6/1996 | Lauer et al. | |
| 5,532,753 A | | 7/1996 | Buchner et al. | |
| 5,589,892 A | | 12/1996 | Knee et al. | |
| 5,675,746 A | | 10/1997 | Marshall | |
| 5,774,878 A | * | 6/1998 | Marshall | 705/36 R |
| 5,784,035 A | | 7/1998 | Hagiwara et al. | |
| 5,809,415 A | * | 9/1998 | Rossmann | 455/422.1 |
| 5,887,081 A | * | 3/1999 | Bantum | 382/173 |
| 6,850,906 B1 | * | 2/2005 | Chadha et al. | 705/36 R |

(Continued)

FOREIGN PATENT DOCUMENTS

EP 0 199 272 A2 10/1986

(Continued)

OTHER PUBLICATIONS

John Helliwell, "Videotex and you", Computers & Electronics, vol. 22, p. 72, Feb. 1984.

*Primary Examiner*—Antonio A Caschera
(74) *Attorney, Agent, or Firm*—Fish & Richardson P.C.

(57) ABSTRACT

A system dynamically displays graphic identifier information, such as corporate logos, and value information for financial instruments, such as recent trade information, on a video wall having several monitors arranged to form a larger display. The system has input ports to receive feeds with identifiers and corresponding values of financial instruments, a filter to extract the identifiers and corresponding values of the financial instruments, a memory to store the extracted information and a table associating the financial instrument identifiers with graphic symbols, and processors to form a display signal with the graphic symbols and values.

16 Claims, 39 Drawing Sheets

U.S. PATENT DOCUMENTS 7,082,398 B1 * 7/2006 Apple et al. .................. 705/1

FOREIGN PATENT DOCUMENTS

EP 0 300 509 A2 1/1989
EP 0 372 384 6/1990
EP 0 627 692 A1 12/1994
EP 0 717 346 A2 6/1996
GB 2 191 069 A 12/1987
WO WO 91/13518 9/1991
WO WO 92/12488 7/1992
WO WO 94/08309 4/1994
WO WO 94/13108 6/1994
WO WO 98/45830 10/1998
WO WO 99/27495 6/1999

* cited by examiner

100 ADRs and 228 Foreigns on Nasdaq had record share and dollar volum
From 1983 to 1993 the average market makers in an issu

TRADING HISTORY

AMERICAN GREETINGS

| | |
|---|---|
| Yrs High Trade | 29 |
| Yrs Low Trade | 21 3/8 |
| Wks High Trade | 25 |
| Wks Low Trade | 23 7/8 |
| Prevs Days Last | 24 1/8 |
| Yr-to-date Vol(000) | 550,608 |
| Wk-to-date Vol | 7,797,300 |
| Prev Days Vol | 2,323,300 |

1100

1200

1300

| | MON | FRI | WK AGO |
|---|---|---|---|
| ISSUES TRADED | 2,882 | 5,065 | 5,083 |
| ADVANCES | 966 | | 1,410 |
| DECLINES | 1,214 | 1,506 | 1,712 |
| UNCHANGED | 702 | | 1,961 |
| NEW HIGHS | 62 | 143 | 88 |
| NEW LOWS | 67 | | 57 |
| ADVANCING VOLUME | 120,026 | 137,982 | 77,146 |
| DECLINING VOLUME 18,288 | | 115,526 | |
| BLOCK TRADES | 6,459 | 5,938 | 3,661 |

1500

1400

1600

1700

| NEW COMPANY LISTINGS | COMPANY DELISTINGS |
|---|---|
| January* | January* |
| -Big Stores | -Warco |
| Sept 4,94 Merger | Sept 3,94 Voluntary |
| -Moores | -NesterMax |
| Sept 4,94 IPO | Sept 4,94 Acquisition |
| -Tabac | -WasteWash |
| Sept 5,94 IPO | Sept 4,94 Voluntary |
| -ReSource | -Tabart |
| Sept 6,94 IPO | Sept 5,94 Voluntary |
| -Suites | |
| Sept 9,94 IPO | *Also available for 1 year |

2300

MEDIA WALL FOR DISPLAYING FINANCIAL INFORMATION

I. BACKGROUND OF THE INVENTION

This invention relates generally to the display of financial information using graphic symbols. More specifically, the invention relates to the use of firm or corporate logos instead of textual abbreviations to identify securities information in a ticker-type format or in the display of other trading information.

Financial trading information displays are typically spartan. For example, tickers report trades only by an alphabetic abbreviation of the security traded followed by information about the trade, such as its price. Technology has only improved the medium, not the message. The original ticker tape reported trades by remotely printing out trade information on a thin strip of paper. Later technologies displayed that same information in rows of lights or on television screens. Throughout these changes, however, the format of the information has remained the same.

Unfortunately, most people find these displays difficult to interpret. Even experienced stock analysts can remember the abbreviations for only a few securities, and the abbreviations, which are only three or four letters, sometimes reflect historic anomalies rather than an attempt to identify the security clearly.

Besides their obscurity, conventional ticker displays also have limited use. They contain minimal financial information and use the same display formats. The displays do not provide contextual information about the market or about a particular issue or security.

One goal of this invention is to improve the display of financial information by identifying securities using their familiar corporate logos rather than textual abbreviations.

Another goal of this invention is to display contextual financial information, such as historical information or information specific to a security or market.

Yet another goal of this invention is to display information about trades between market makers in a format that is easy to comprehend.

Still another goal of this invention is to provide such information along with real-time or stored video and audio information.

An additional goal of this invention is to provide such information either in a standard schedule or in response to external events, such as dramatic changes in a stock price or user inputs.

II. SUMMARY OF THE INVENTION

These and other objects of the invention can be obtained by this invention for displaying financial information on a video wall by identifying securities and other entities by logos, and by providing real-time control of the displayed financial information.

In particular, a system according to this invention for dynamically displaying graphic symbols and value information for financial instruments comprises an input port to receive a feed containing identifiers and corresponding values of financial instruments; filter means for extracting from the feed the identifiers and corresponding values of the financial instruments; a memory; correlating means for finding in a data structure graphic symbols associated with the extracted identifiers; formatting means for forming a display signal with the graphic symbols and values corresponding to the financial instruments in the feed; and a video wall. The memory contains the extracted financial instrument identifiers and corresponding values, as well as the data structure associating the financial instrument identifiers with graphic symbols. The video wall includes several individual monitors arranged into a larger display plus means for receiving the display signals and for displaying on the individual monitors the graphic symbols and values corresponding to the financial instruments in the feed.

Both the foregoing general description and the following detailed description are exemplary and explanatory. They provide further explanation of the invention as claimed.

III. DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings:

FIG. 1 contains a diagram of a video wall in accordance with this invention;

FIG. 3 is a picture of a market message for the video wall in FIG. 1;

FIG. 5 is a picture of a company trading history for the video wall in FIG. 1;

IV. DESCRIPTION OF THE PREFERRED IMPLEMENTATION

A. System Overview

1. Video Wall Displays

Figure 1:
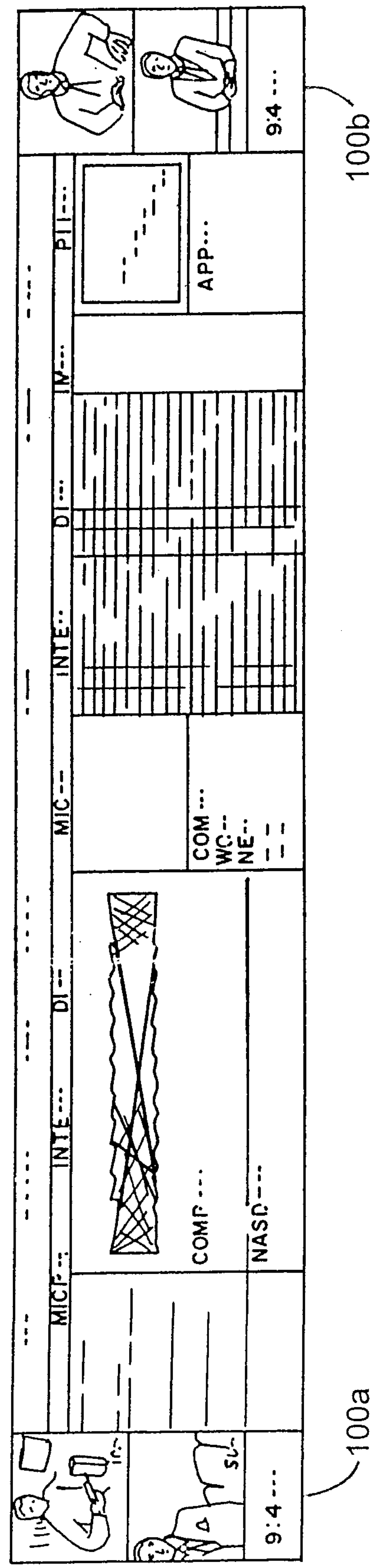
FIG. 1A is a diagram of the video wall of FIG. 1 divided into several areas.

FIG. 1 contains a diagram of a video wall 100 composed of a matrix of video monitors 100*a*, 100*b*, etc. Video wall 100 can include static, dynamic, and real-time displays as well as combinations of such displays. Information for the displays can come from many sources. For example, video and audio information can come from cable or network news or closed circuit feeds, and data can come either from securities exchanges, such as The NASDAQ Stock Market, or from vendor or market data.

Figure 1A:
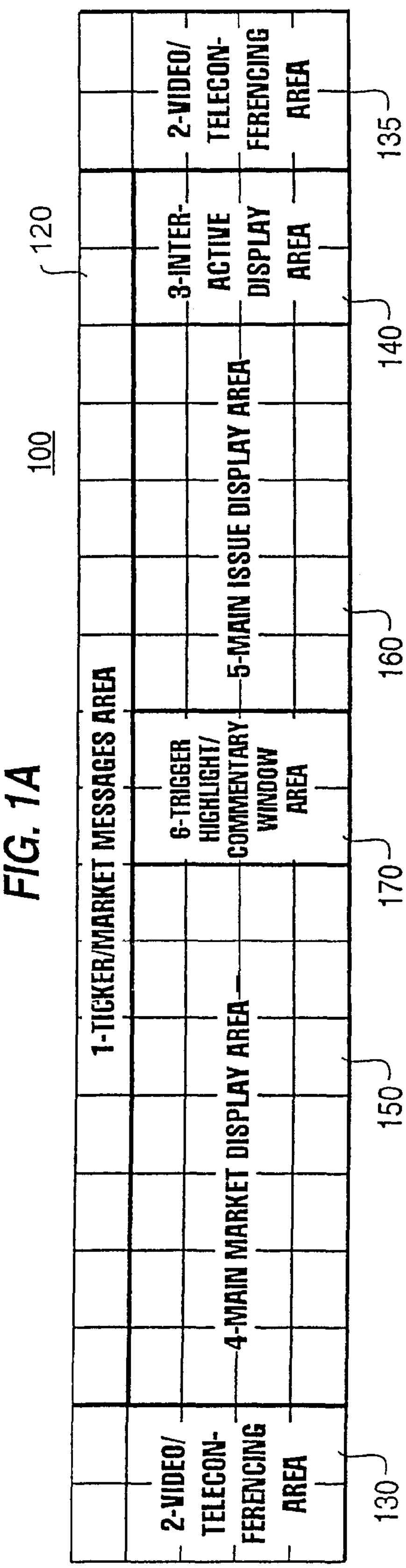

FIG. 1A shows an outline of video wall 100 of FIG. 1 divided into several areas: ticker-market message area 120, video/teleconferencing areas 130 and 135, interactive display area 140, main market display area 150, main issue display area 160, and commentary window area 170. The types, numbers, sizes, and relative locations of these areas are not critical to the invention. FIG. 1A merely illustrates one possible organization of wall 100 and provides a mechanism to describe the areas in greater detail.

In the preferred implementation, ticker-market message area 120 serves two functions. When a market is open, area 120 contains a dynamic ticker display. At other times, area 120 scrolls market facts or other messages.

Video/teleconferencing areas 130 and 135 can show videos of company profiles, broadcasts, or news wires. Areas 130 and 135 can also display interactive graphics.

Interactive display area 140 preferably includes interactive display elements for special groups present at video wall 100. For example, representatives from a specific company can request a peer group display to compare the company's performance to that of its peers.

Main market display area 150 contains real-time and historical graphics showing trading information and activity in a main market. In the preferred implementation, the main market is The NASDAQ Stock Market.

Main issue display area 160 contains real-time and historical graphics for individual securities. For example, when some special event occurs, such as a new high or a public offering, main issue display area 160 can show financial information about the security. Area 160 can also show information about groups of securities, such as quotes of the ten most active securities.

The remaining area of video wall 100 in FIG. 1A is commentary window area 170. In the preferred implementation, area 170 presents either live commentary of recent market activity or information about daily events.

FIGS. 2-19 contain different types of displays for areas 120-170. Again, the displays are illustrative, not exhaustive.

Figure 2:
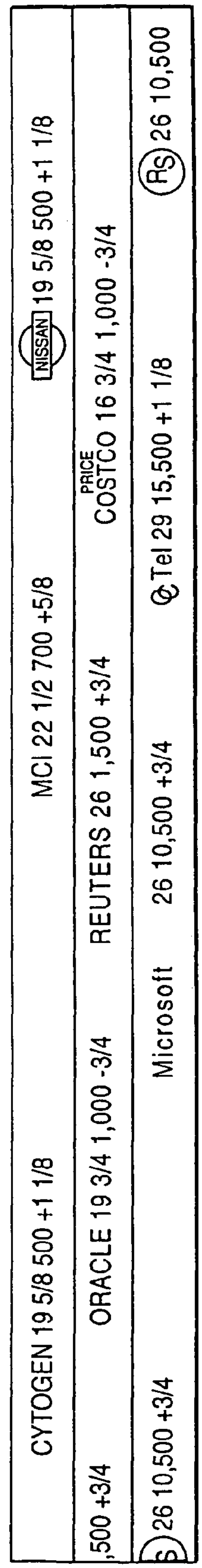
FIG. 2 is a picture of a ticker display for the video wall in FIG. 1.

FIGS. 2 and 3 show ticker and market message displays for area 120. FIG. 2 includes a moving ticker display 200 showing last-sales reports for The NASDAQ Stock Market. The display can also show similar reports for other markets or for trades involving ADR (American Depository Registry) and non-U.S. issues. Display 200 can also report block trades on The NASDAQ Stock Market.

Display 200 shows several moving display entries. Each entry corresponds to a security and includes a logo corresponding to the security, the price of the security, the number of shares traded, and the change in the security's price. Although display 200 preferably scrolls from right to left in three rows, the direction of the scrolling and the number of rows is a design choice.

FIG. 3 shows a market message 300 in display area 120. Message 300 delivers general announcements and market facts, and gives important messages to viewers. Message 300 usually appears when there is no market activity.

Figure 4A:
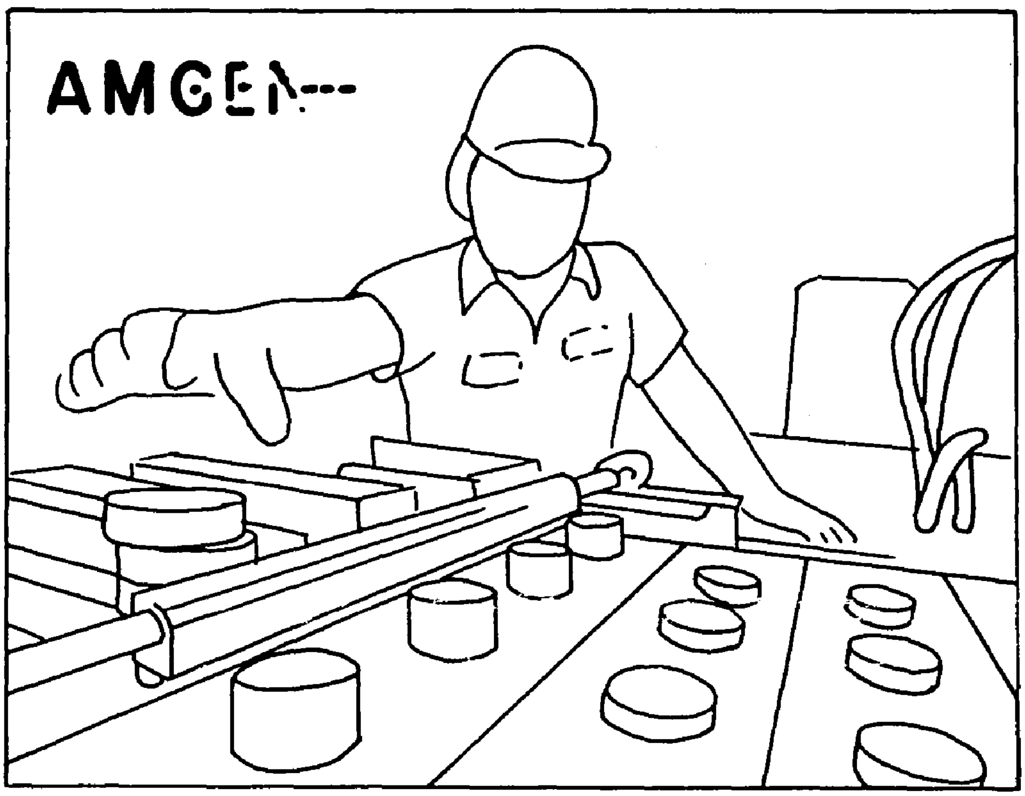
FIG. 4A is a picture of a promotional video for the video wall in FIG. 1.
Figure 4B:
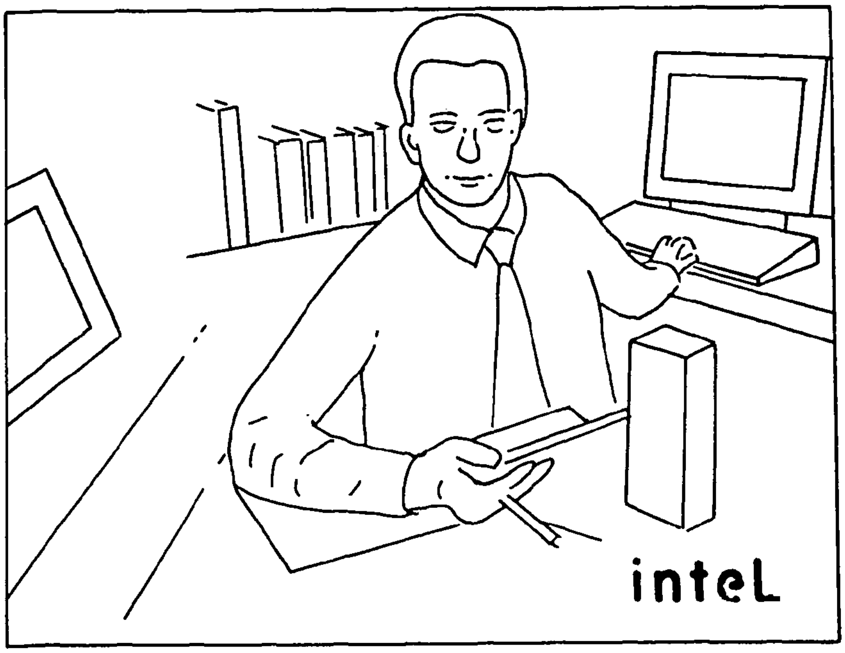
FIG. 4B is a picture of a teleconferencing window for the video wall in FIG. 1.
Figure 4C:
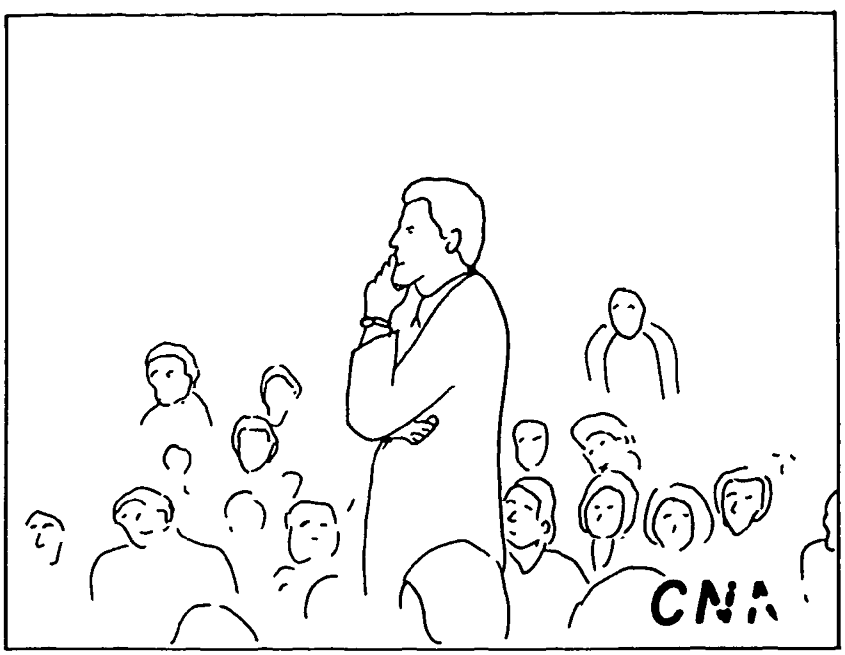
FIG. 4C is a picture of a news window for the video wall in FIG. 1.

Video/teleconferencing areas 130 and 135 contain a variety of real-time or recorded video information. For example, FIG. 4A shows promotional videos provided by listed companies. FIG. 4B shows a teleconferencing window so company executives, economists, market analysts, or other personalities brought to the market can share their opinions and analyses. FIG. 4C shows a news window to broadcast important and breaking news. Areas 130 and 135 can also contain text from news wires instead of video information.

Figure 6:
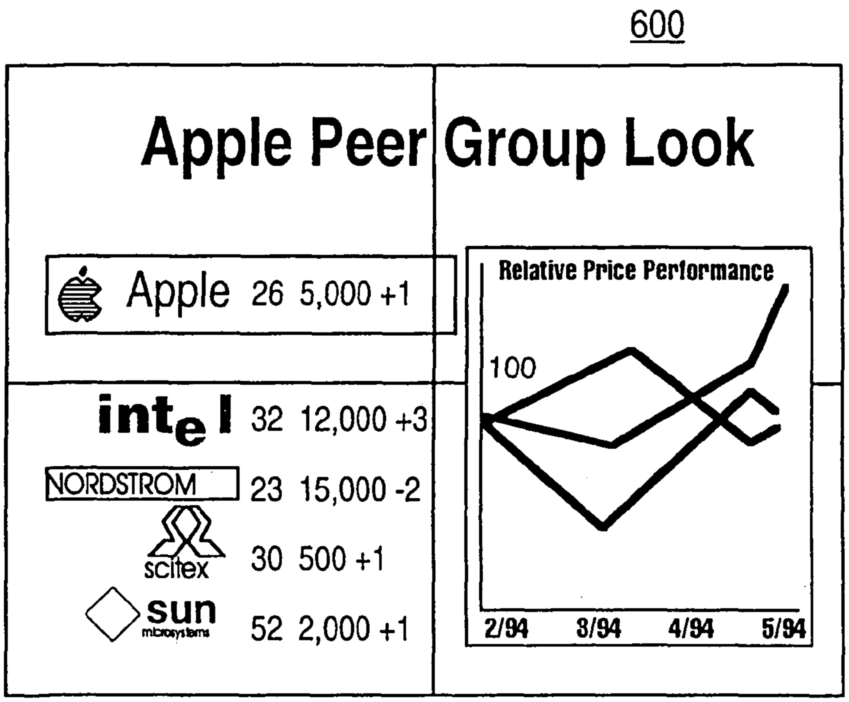
FIG. 6 is a picture of a peer group display for the video wall in FIG. 1.
Figure 7:
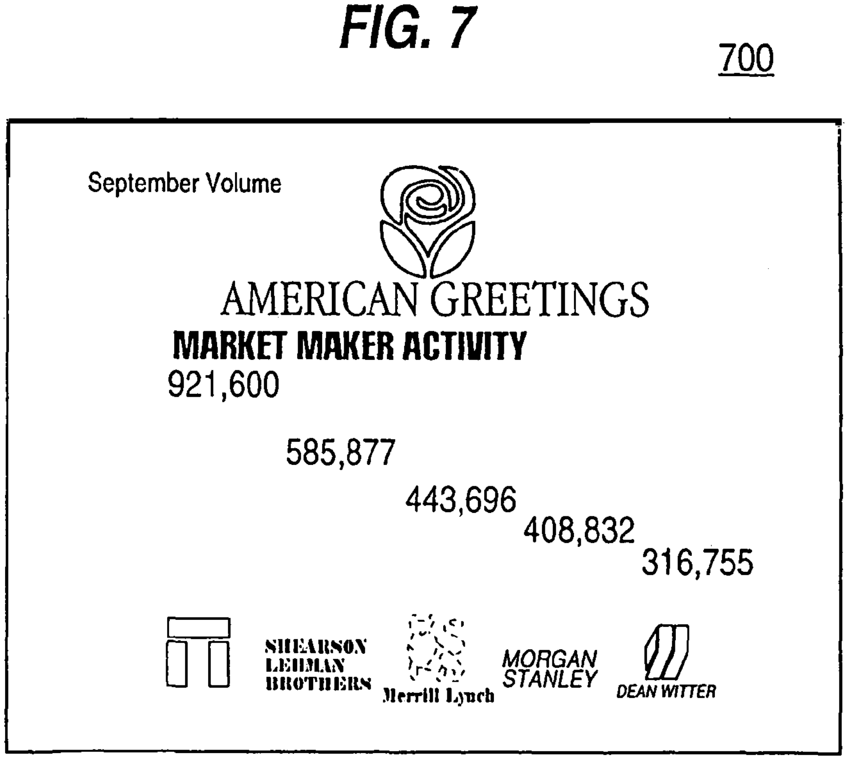
FIG. 7 is a picture of a market maker summary for the video wall in FIG. 1.

FIGS. 5-7 show three types of displays for interactive display area 140. FIG. 5 shows a company trading history 500. History 500 provides a brief summary of the activity of a particular security and can also include the volume and high and low prices for that security.

FIG. 6 shows a peer group display 600. Peer group display 600 compares a company's performance to that of similar companies. Display 600 can also compare a security's price and volume for a previous day, week, or year-to-date.

FIG. 7 contains an example of a market maker summary 700. Market maker summary 700 summarizes the activity of a group of market makers, such as those market makers for a particular issue. Summary 700 may also include the volume of a particular issue for each market maker's sponsorship.

Figure 8:
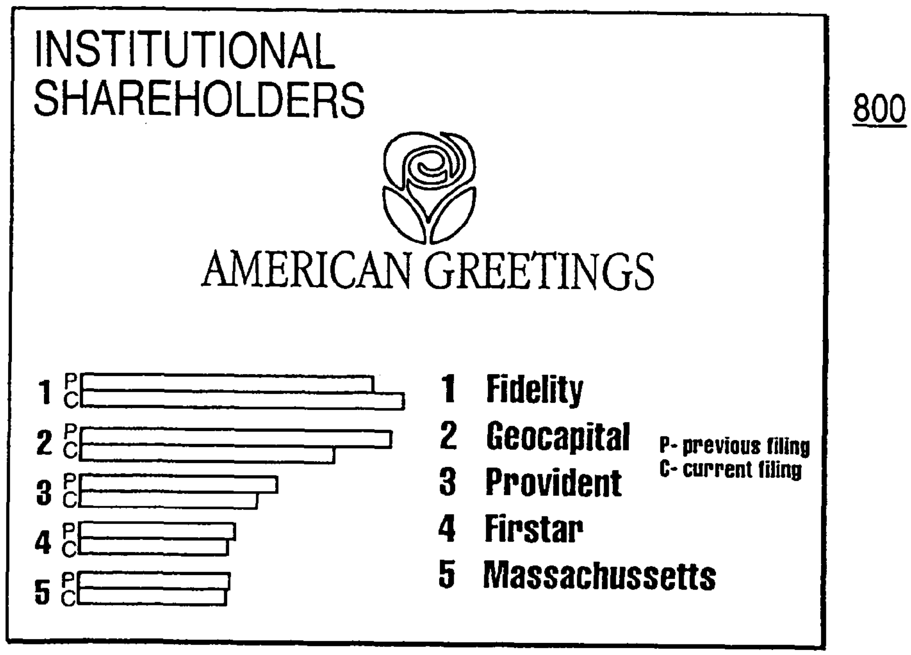
FIG. 8 is a picture of an institutional holding display for the video wall in FIG. 1.

FIG. 8 contains institutional holding display 800. Display 800 reveals a ranking, by shares held, of the top five institutional shareholders in an issue.

This list of displays for interactive display area 140 is not exhaustive. For example, an interactive display element could show the ranking of the top institutional shareholders in a particular security according to the number of shares held.

Figure 9:
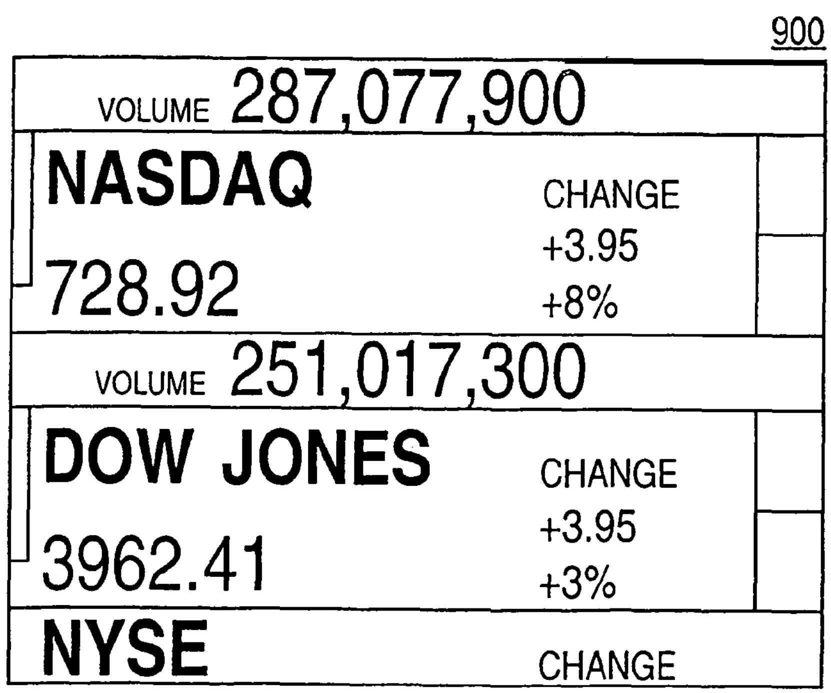
FIG. 9 is a picture of a market summary display for the video wall in FIG. 1.

FIGS. 9-14 contain examples of displays in the main market display area 150. FIG. 9 is a market summary display 900 that reviews the real-time performance of domestic stock markets. The review can also include composite indices and trading volumes as well as change and percent change information.

Figure 10:
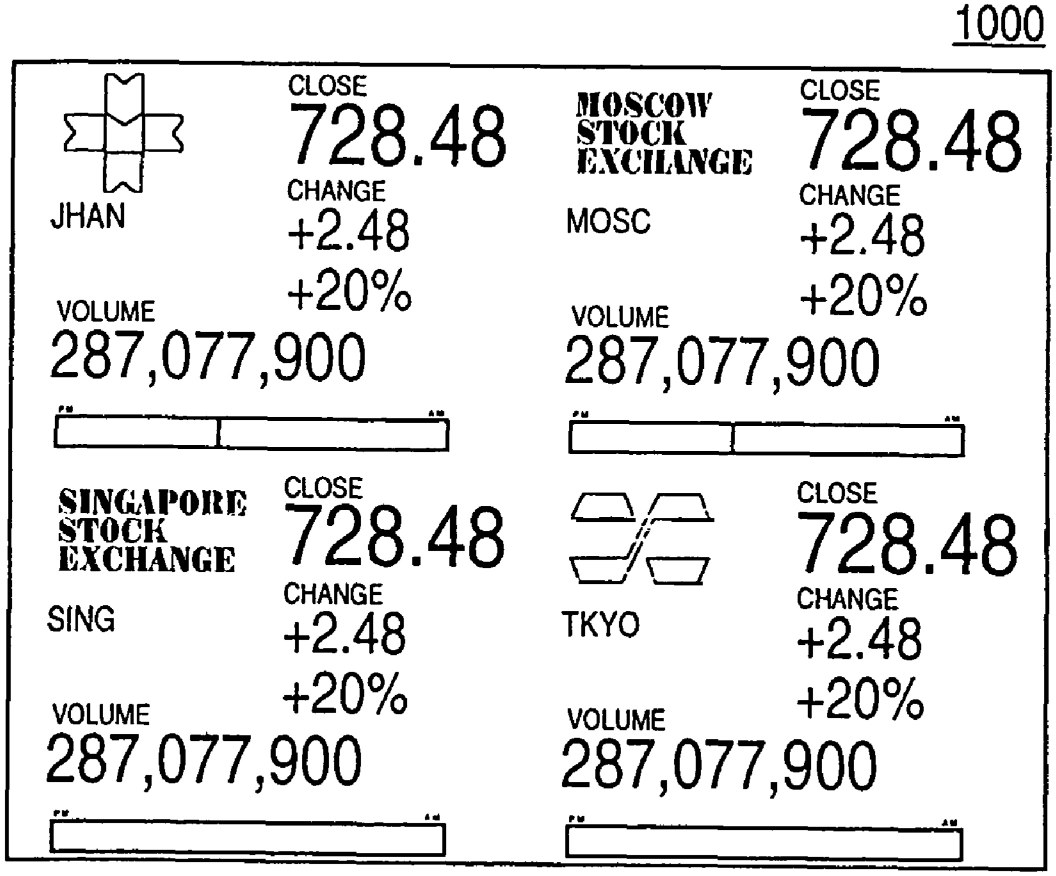
FIG. 10 is a picture of an international market summary for the video wall in FIG. 1.

FIG. 10 shows an international market summary 1000. Display 1000 summarizes the index, value, and volume for the day on major foreign exchanges.

Figure 11:
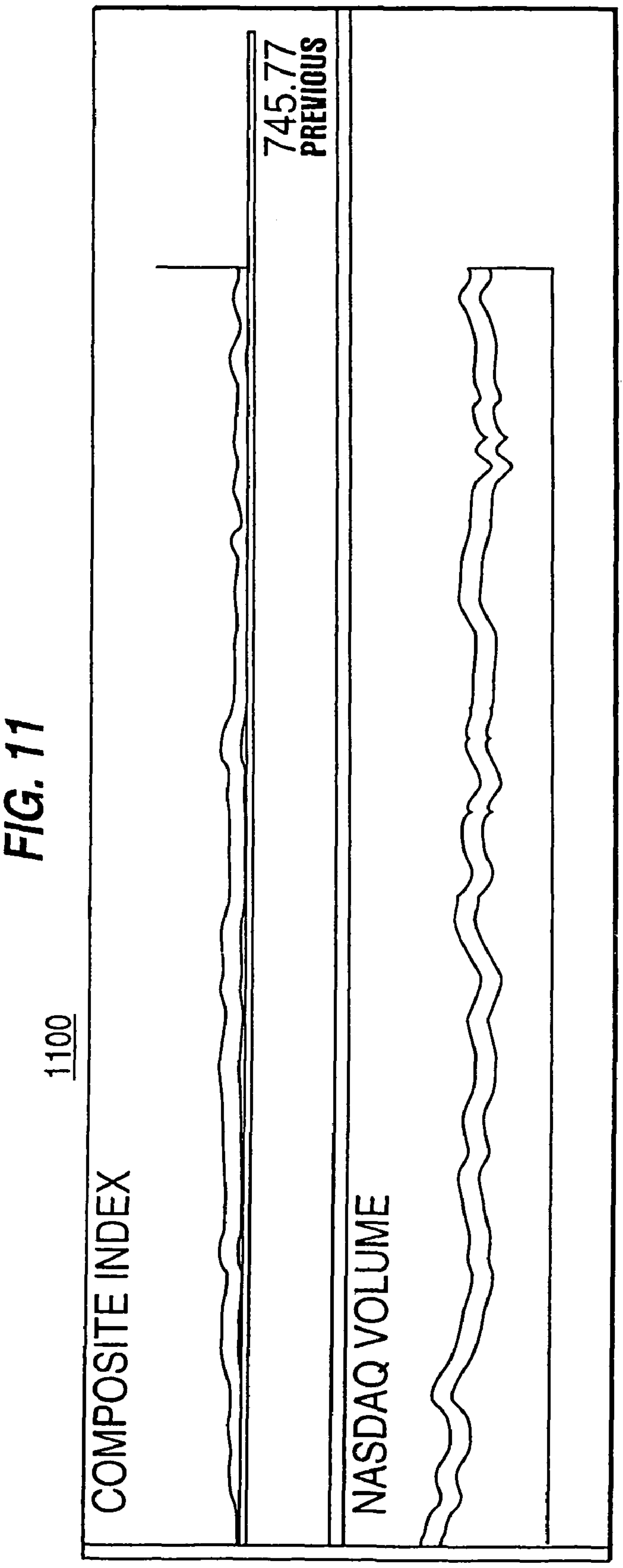
FIG. 11 is a picture of a market index and volume wave display for the video wall in FIG. 1.

FIG. 11 contains market index and volume wave display 1100. Display 1100 graphically tracks, in real time, the current day's index in volume activity. Display 1100 can also include a display of the composite index in a two and a half-dimensional (i.e., two dimensional with the appearance of three dimensions) display of the volume on The NASDAQ Stock Market.

Figure 12:
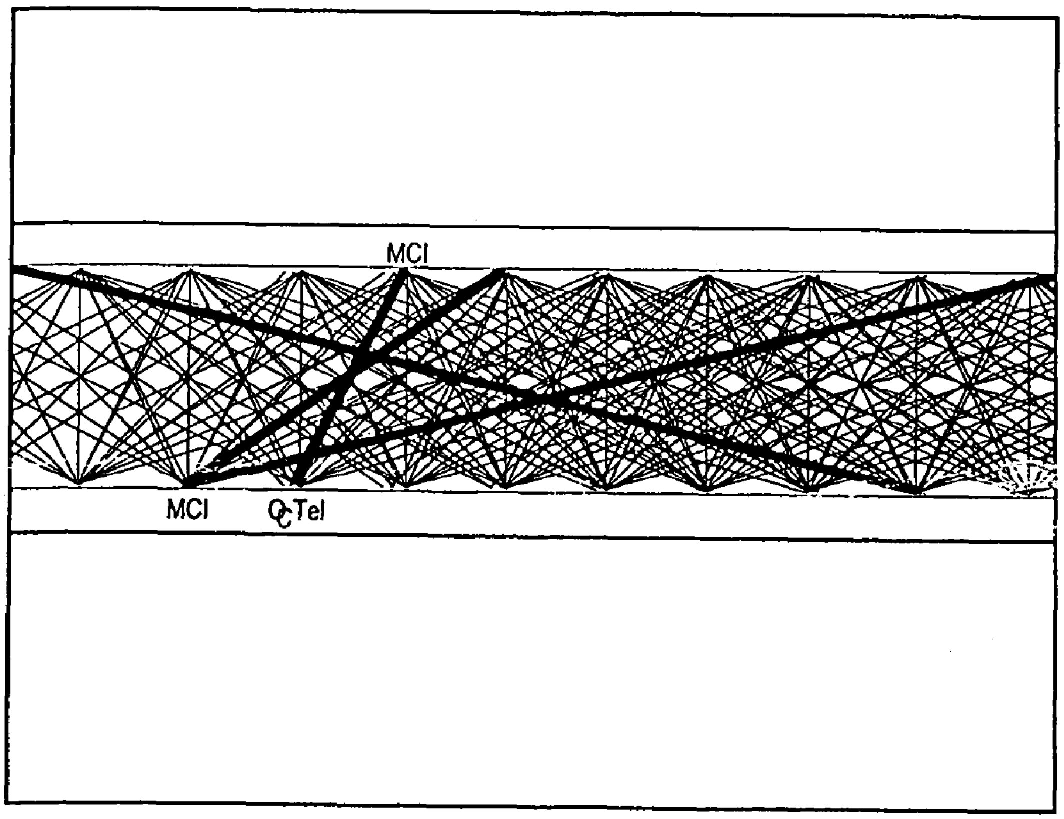
FIG. 12 is a picture of a market activity display for the video wall in FIG. 1.

FIG. 12 shows a market activity display 1200. Market activity display 1200 dynamically presents real-time trading between the largest market makers in the most actively traded and largest capitalized issues. A solid red line between two market makers identifies a trade executed in a particular security. The market makers and the security are identified by their logos.

Figures 13, 15:
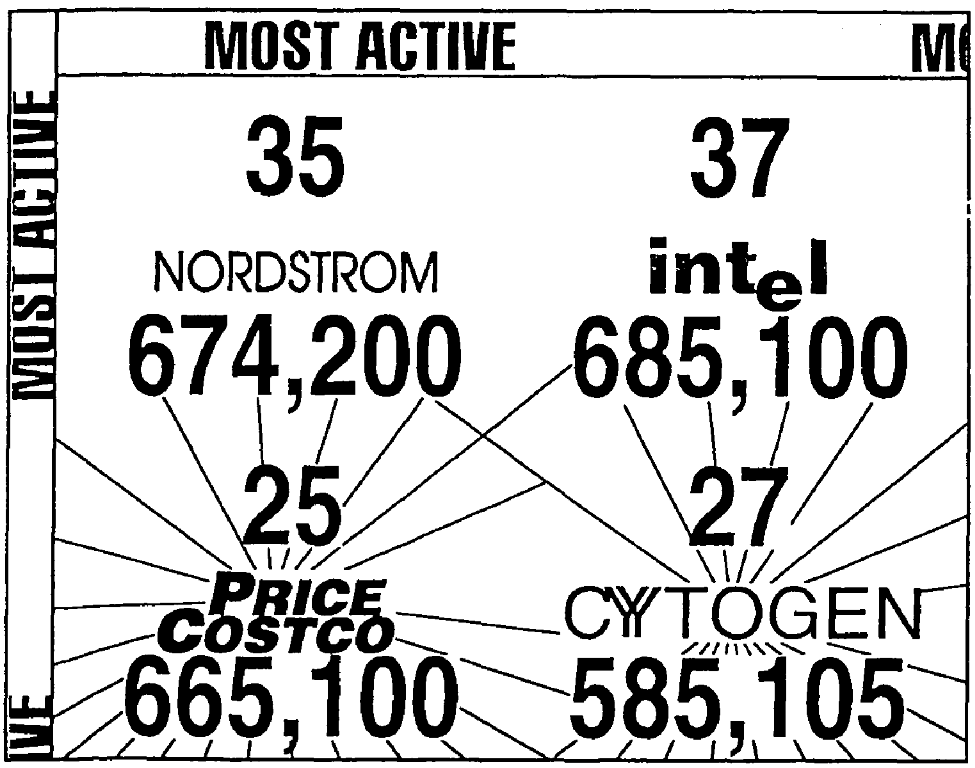
FIG. 13 is a picture of a trading summary display for the video wall in FIG. 1.
FIG. 15 is a picture of a display of the most active issues for the video wall in FIG. 1.

FIG. 13 contains a trading summary display 1300. Display 1300 summarizes the day's trading characteristics for the market. The summary includes the number of issues traded, number of advances, number of declines, the number unchanged, new highs, new lows, advancing and declining volume, and block trades. The summary can also include values for previous day and the previous week for comparison.

Figure 14:
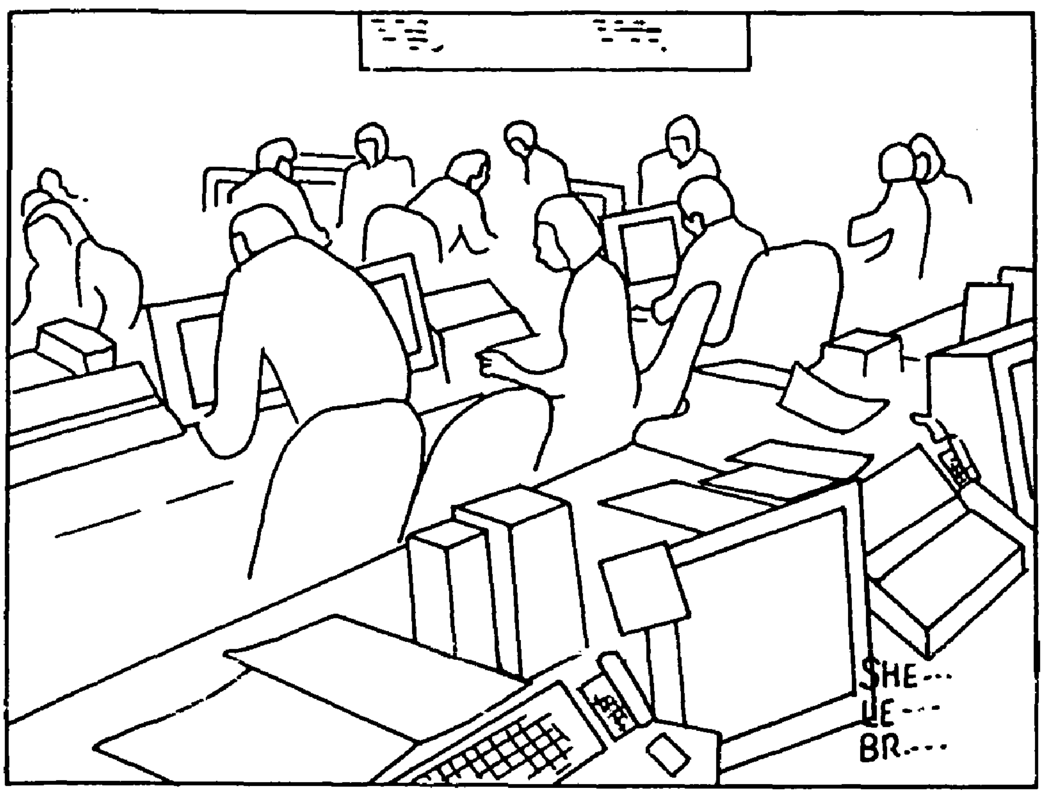
FIG. 14 is a picture of a trading room window for the video wall in FIG. 1.

FIG. 14 shows a trading room window 1400. Trading window 1400 broadcasts live events from different market maker trading rooms.

Again, the displays in FIGS. 9-14 are not all possible uses of main market display area 150. Those displays merely illustrate some possible displays.

The main issue display area 160 can also include several different displays, some of which appear in FIGS. 15-18. FIG. 15 contains a display 1500 for the most active issues. Display 1500 summarizes and highlights the real-time trading activities of the ten most active issues ranked by volume. Of course, display 1500 could contain the same or similar information for different numbers of issues, and could rank them differently.

Figure 16:
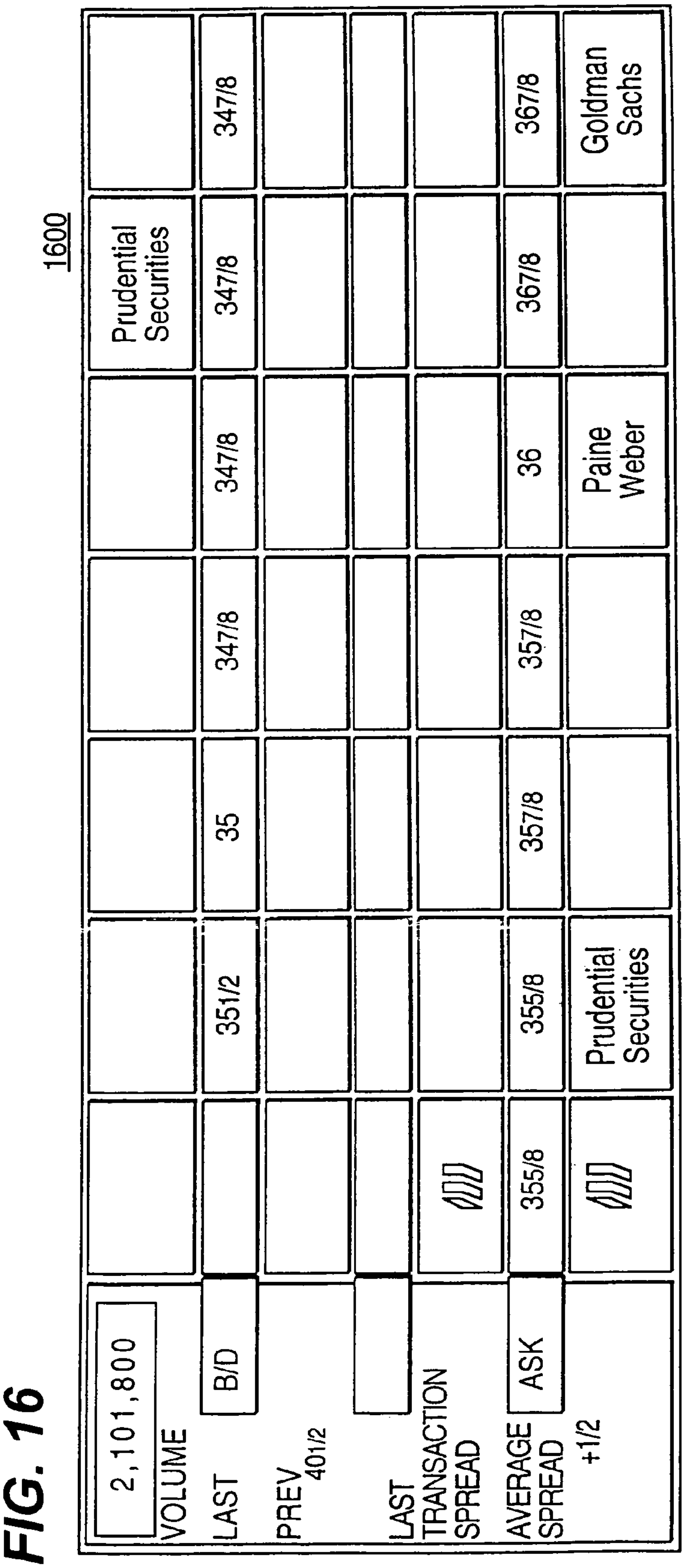
FIG. 16 is a picture of an issue quote activity display for the video wall in FIG. 1.

FIG. 16 presents an issue quote activity display 1600 that may be accessed interactively. Display 1600 shows the dynamic quote activity of market makers in a specific issue or group of issues, and highlights the inside quote or best prices. Issue quote activity display 1500 can also show every market maker as well as the best five prices on either side of the marketing issue.

Figure 17:
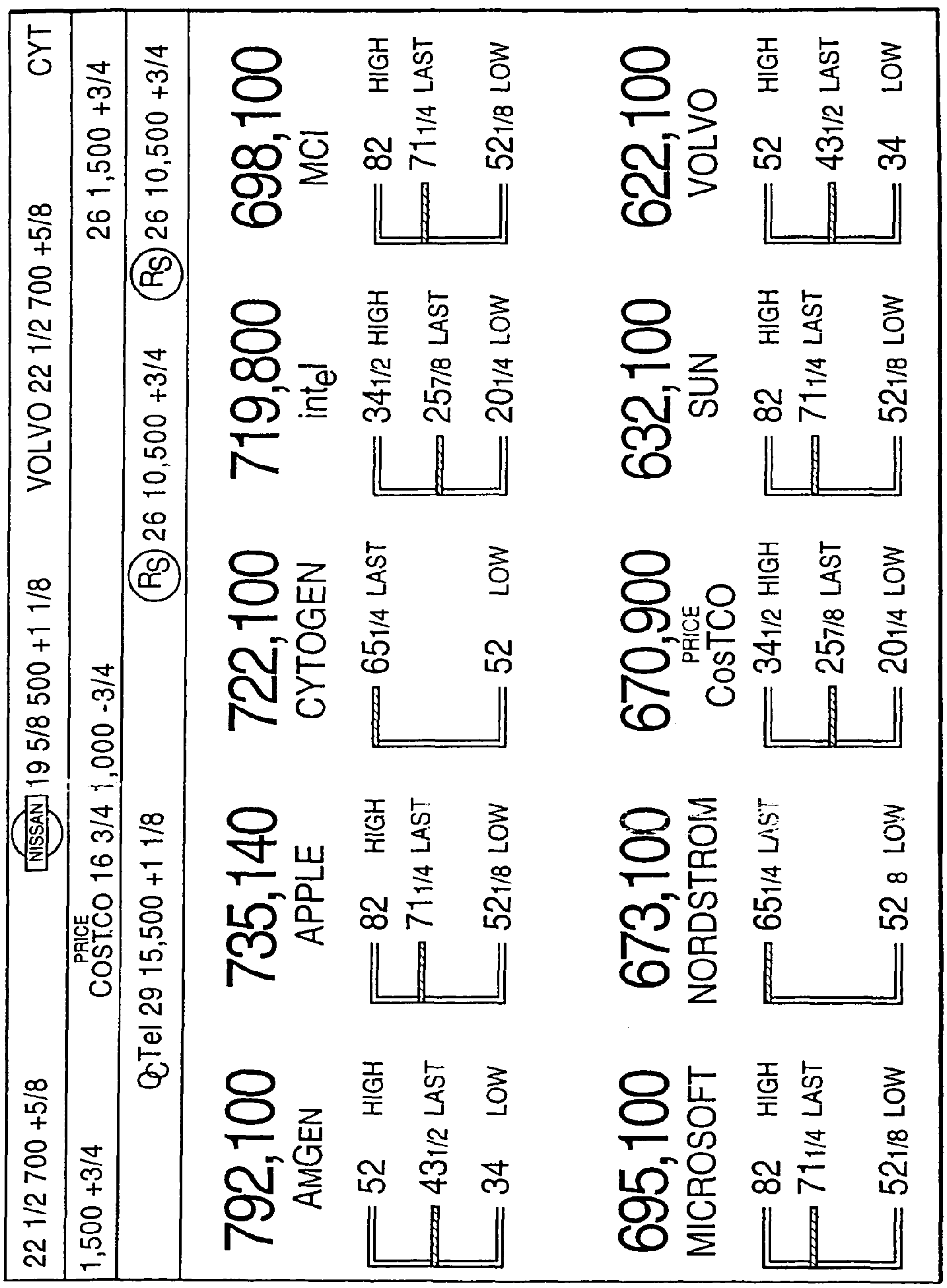
FIG. 17 is a picture of leading advancing and declining issues in FIG. 1.

FIG. 17 is summary display 1700 showing leading advancing and declining issues. Display 1700 indicates the relative price performance of the current day's leading securities.

Figure 18:
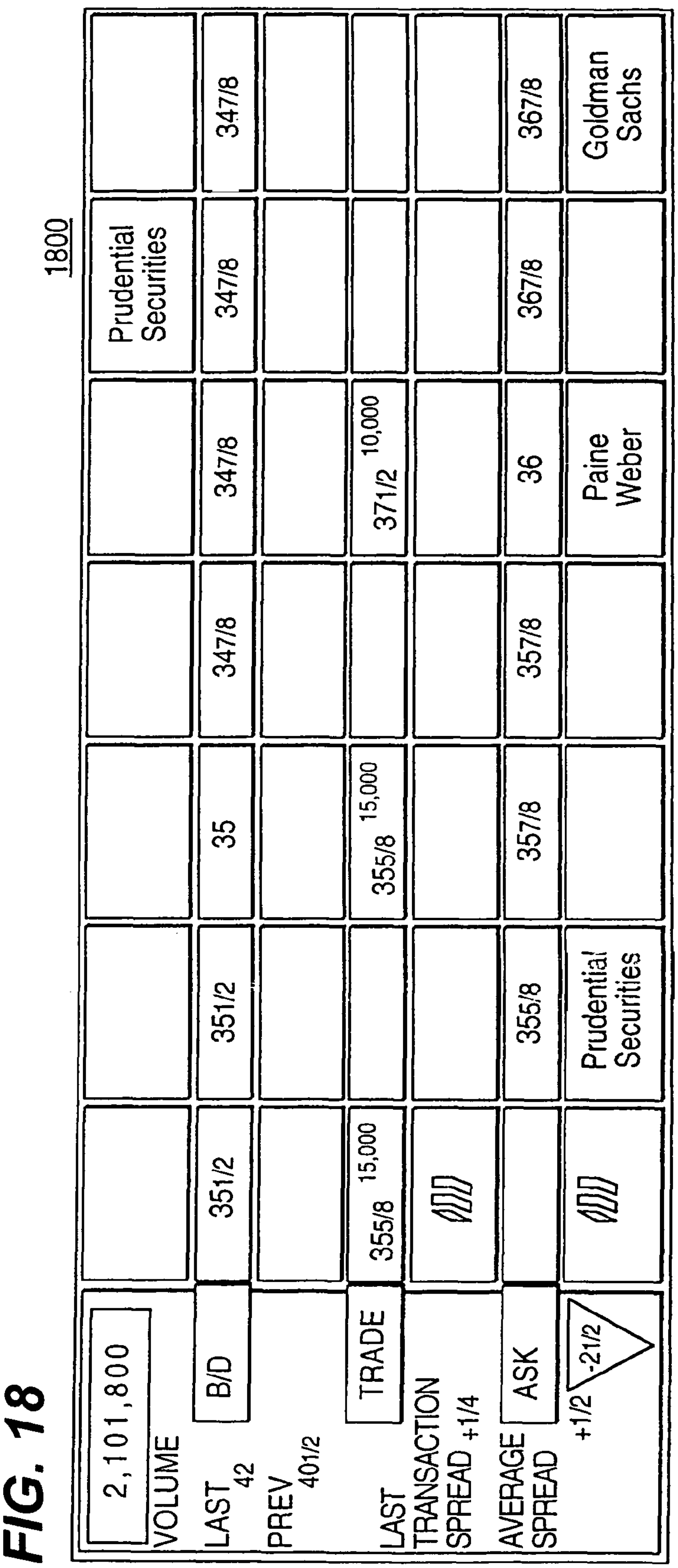
FIG. 18 is a picture of an issue trading activity display for the video wall in FIG. 1.

FIG. 18 contains an issue trading activity display 1800 showing real-time trading activity for a particular issue or group of issues. Display 1800, which may also be interactive, graphically displays the activity of market makers as they quote and trade those issues. In addition, display 1800 highlights the market maker inventory orders and public orders and shows the pricing dynamics. Display 1800 can also show the best price over other quotes and illustrate the depth in an issue's market by showing the number of market makers at the inside.

Figure 19A:
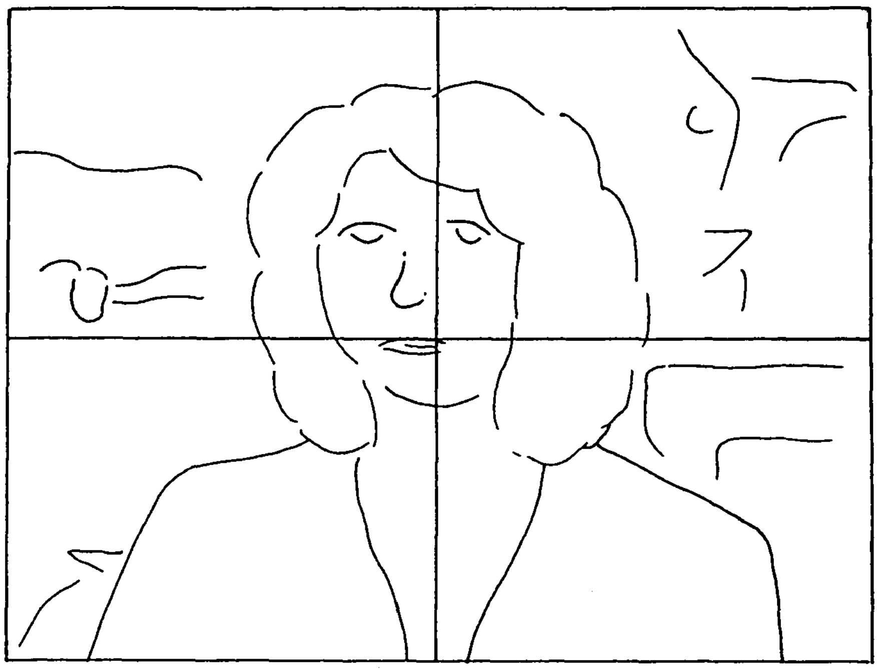
FIG. 19A is a picture of a display showing live commentary to discuss the day's market activities and provide summaries and analysis.
Figure 19B:
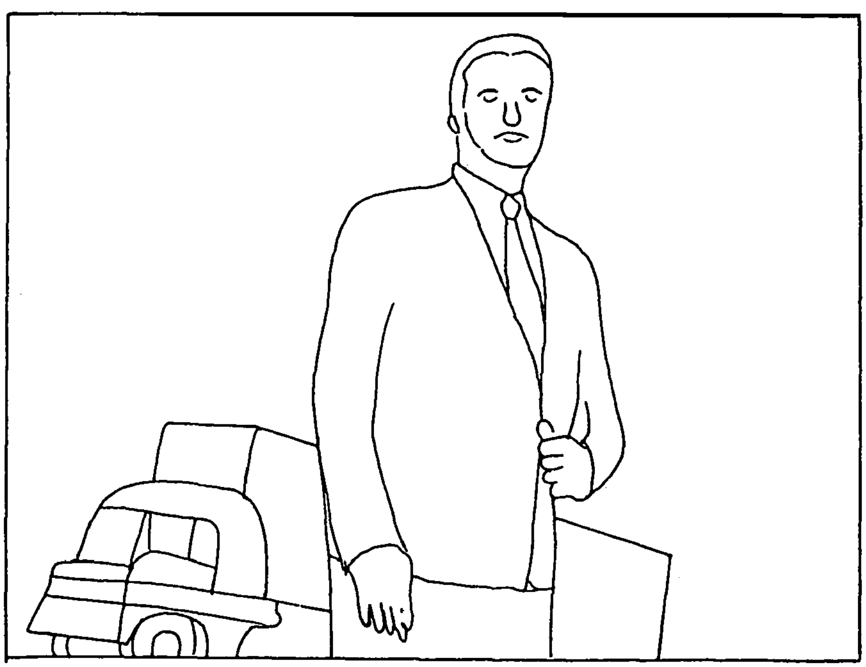
FIG. 19B is a picture of a display showing IPO conferencing for live discussion with underwriters.
Figures 19C, 19D:
FIG. 19C is a picture of a display summarizing listings and delistings of issues in the previous month
FIG. 19D is a picture of a display showing an IPO flag to provide a graphic introduction for an IPO's first trade
Figure 19E:
FIG. 19E is a picture of a display showing a new high issue price or volume.
Figure 19F:
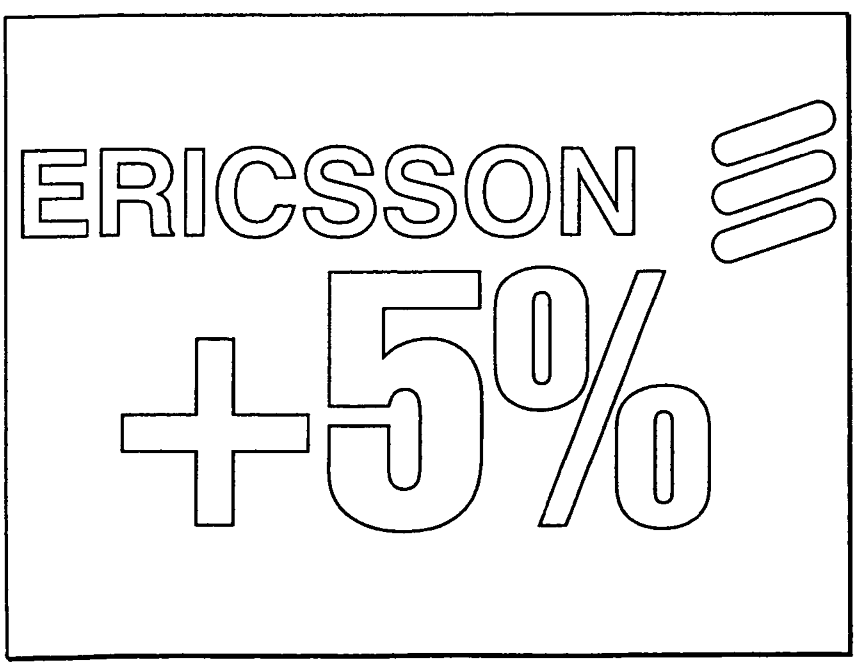
FIG. 19F is a picture of a display highlighting unusual price or volume changes when they occur during real-time trading.
Figure 19G:
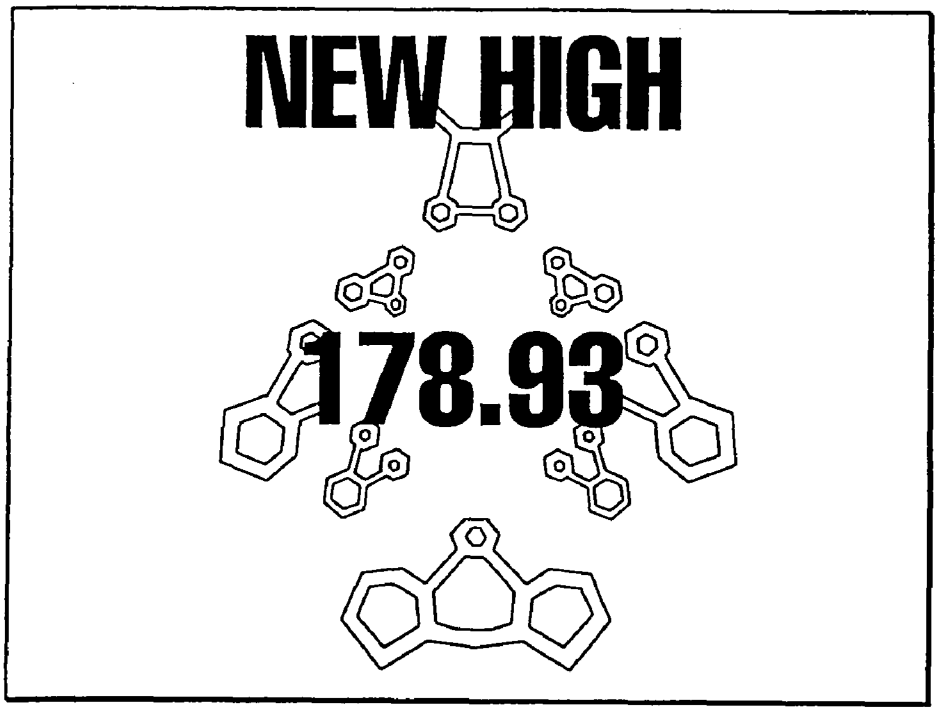
FIG. 19G is a picture of a display showing new highs for an index or its volume as they occur during real-time trading.
Figure 19H:
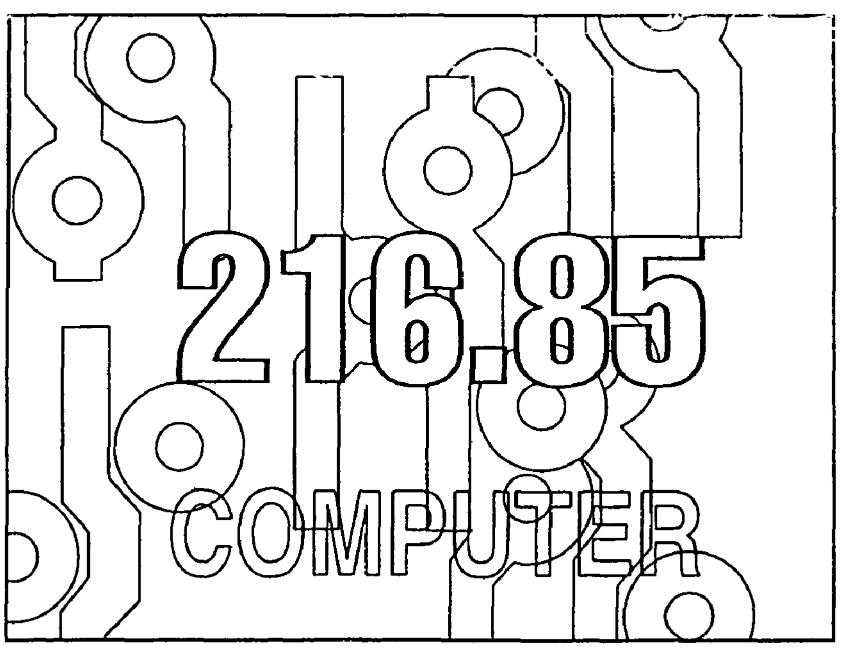
FIG. 19H is a picture of a display showing when the value of an index changes significantly during real-time trading.

The remaining area is the commentary window area 170. Area 170 may contain several different displays, such as those shown in FIGS. 19A-H. FIG. 19A shows live commentary to discuss the day's market activities and provide summaries and analysis. FIG. 19B shows IPO conferencing for live discussion with underwriters. FIG. 19C summarizes listings and delistings of issues in the previous month. FIG. 19D displays an IPO flag as a graphic introduction for an IPO's first trade. FIG. 19E shows a new high issue price or volume. FIG. 19F highlights unusual price or volume changes when they occur during real-time trading. FIG. 19G shows new highs for an index or its volume as they occur during real-time trading. FIG. 19H shows when the value of an index changes significantly during real-time trading.

2. System Elements

Figure 20:
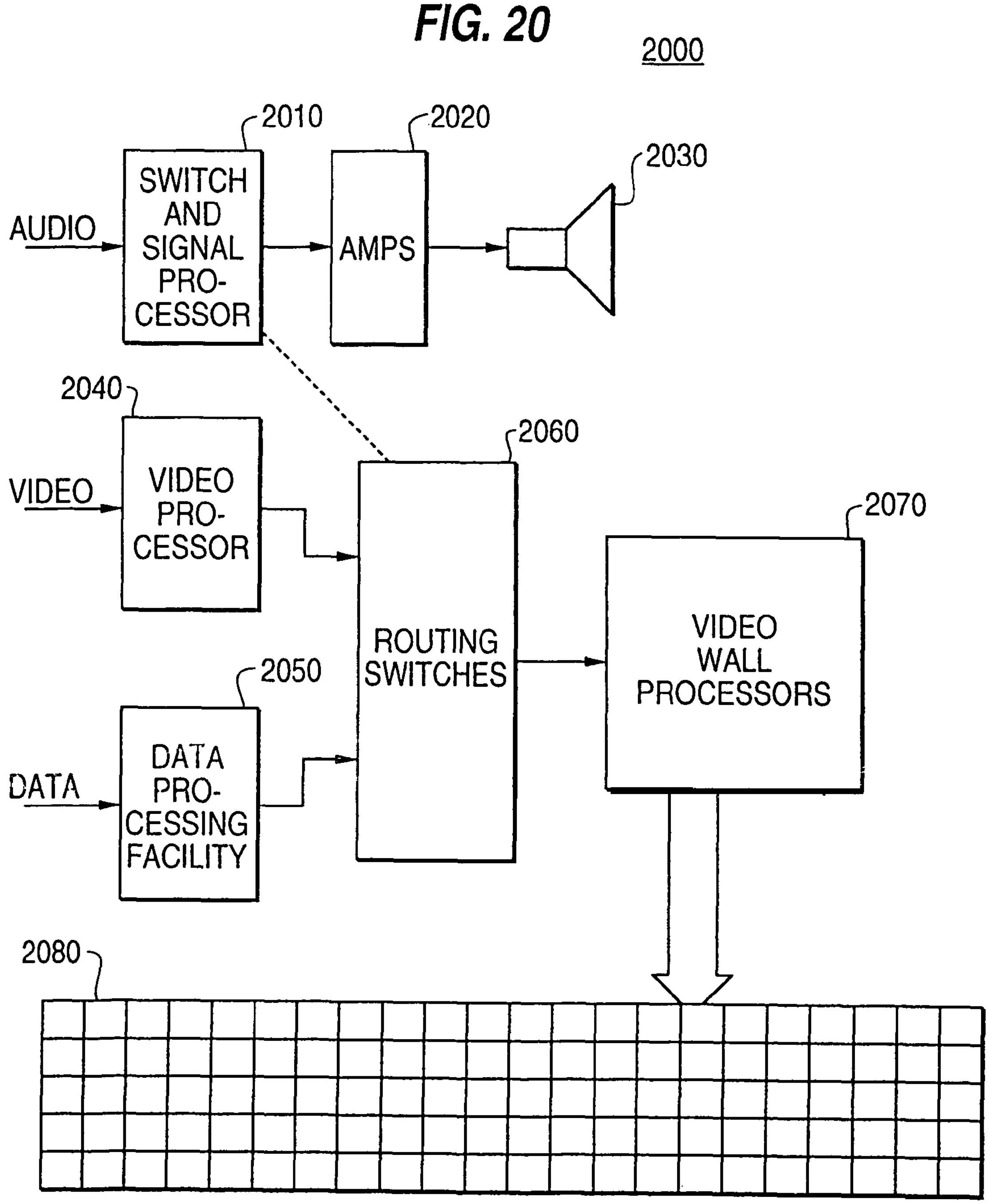
FIG. 20 is a block drawing of the major system elements of an embodiment of this invention.

To produce the video displays in FIGS. 1-19A-H, a system according to this invention receives several inputs, and processes and formats those inputs to make it appear that all the screens in the video wall, or at least all the screens in some group, display a fixed or moving composite image. FIG. 20 is a block diagram showing the major elements of a preferred implementation of a system 2000 according to this invention.

System 2000 in FIG. 20 receives three types of inputs: audio, video, and data. The audio inputs can be live audio feeds, such as from radio or television, or can be VCR audio tracks. Possible audio inputs also include DAT (e.g., for high quality audio presentations), sampled digital audio or mini-CD (e.g., for sound effects), microphones (e.g., for speeches and presentations), CD audio (e.g., for music), and analog tape (e.g., for general audio information). Other audio sources can be the telephone (e.g., for interviews) or a tone generator (e.g., for diagnostic sounds).

The video inputs can be feeds from cable networks (e.g., CNN, FNN, CNBC), from broadcast networks (e.g., ABC, CBS, NBC, FOX), from closed circuit TV, or from live camera shots of remote images, trading rooms, or boardrooms. Video inputs may also come from ¾ inch tape, laser disks, Betacam SP, SVHS, photo CDs (e.g., for photographs), or a video pattern generator (e.g., for diagnostics).

There are also several possible sources of data. For example, the NWII (NASDAQ Workstation II) can provide market trade data from The NASDAQ Stock Market, the ACT (Automated Confirmation Transaction) Service can provide NASDAQ trade reporting data, and the CDA can report NASDAQ company information. Other data feeds include Bridge Dow Jones News, Knight Ridder Financial News, Reuters News, and AP Dow Jones. The PR news wire can provide company press releases as well. In addition, graphics imaging computers can provide financial graphs, and multimedia computers can provide data for multimedia presentations.

As FIG. 2000 shows, audio feeds enter an audio switch and signal processing system 2010. System 2010 switches the audio inputs to the appropriate outputs and performs certain signal processing on the audio inputs, such as mixing and equalizing, to condition them. Preferably, system 2010 uses standard audio signal processing system elements well known to persons of ordinary skill in the art.

The audio outputs of system 2010 connect to amplifiers 2020 that adjust the signal levels of the audio outputs appropriately. Amplifiers 2020 can also be standard audio equipment well known to persons of ordinary skill in the art.

Amplifiers 2020 drive speakers 2030. The type, size, and locations of speakers 2030 depend on several factors, such as the environment for system 2000 and the anticipated audience.

Video feeds enter a video processor 2040. Video processor 2040, which can include VCR equipment, conditions the video feeds to provide desired signal characteristics.

Data signals enter a data processing facility 2050 that includes a network of processors and equipment to condition, filter, store, and format the data as needed for the displays. Data processing facility 2050 also converts its outputs to video signals.

Systems 2040 and 2050 provide inputs to routing switches 2060. Routing switches 2060 connect the video signals to different outputs so each image can be displayed at different locations. Routing switches 2060 are preferably standard video switches known to persons of ordinary skill in the art. In addition, routing switches 2060 are also preferably synchronized with audio switch and signal processing system 2010 (shown schematically by the dotted line) to provide a proper performance of related audio and video information.

Routing switches 2060 provide inputs to the video wall processors 2070. In the preferred embodiment, the video wall processors are ULTRAMAX processors manufactured by IMTECH Corporation. Such processors are described in greater detail in U.S. Pat. No. 4,746,981 and U.S. Ser. No. 08/231,431, which are incorporated herein by reference. Video wall processors 2070 receive and process high resolution VGA signals, standard video signals, or even high definition television signals, and send the processed video signals to the matrix of monitors 2080 in video wall 100.

Usually, video wall processors 2070 need to expand the video signals from video processors 2040 or data processing facility 2050 because those signals do not have the proper aspect ratio or size for the monitors 2080 on video wall 100. Processors 2070 may also control other video effects, such as splitting images.

Devices 2080 in video wall 100 preferably form a 20×5 matrix to display the video from a video source or from data processing facility 2050. Monitors 2080 collectively form the displays shown in FIGS. 1-19A-H.

Figure 21:
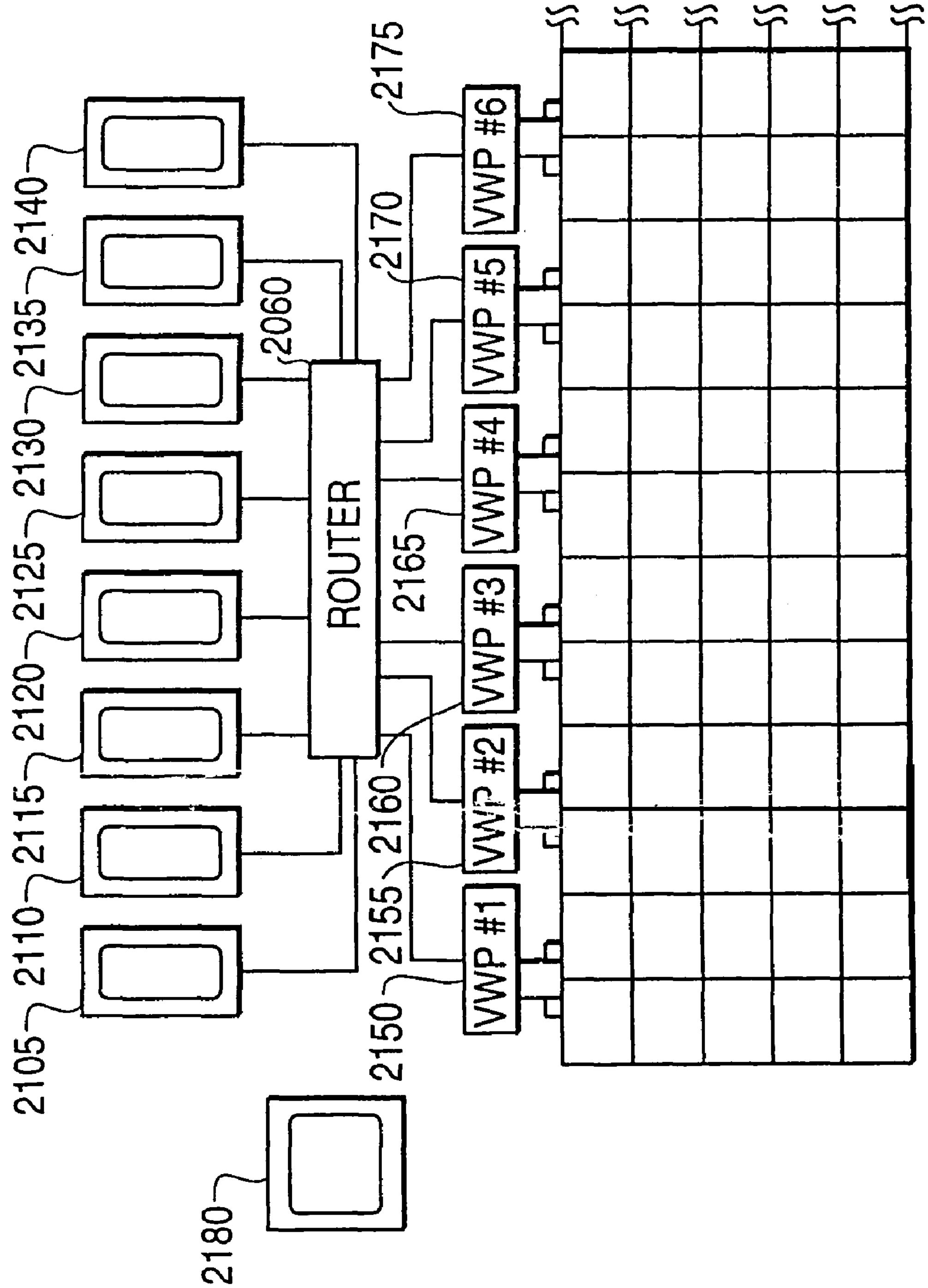
FIG. 21 is a diagram of elements of the data processing facility in FIG. 20.

FIG. 21 shows an embodiment of data processing facility 2050 of FIG. 20 in greater detail. In FIG. 21, data processing system 2050 includes display data processors 2105, 2110, 2115, 2120, 2125, 2130, 2135, and 2140. The number of such processors can vary according to the number of monitors in the video wall. For example, a 20×5 array of monitors preferably uses ten to twenty computer systems.

Each processor 2105-2140 contains a graphics adapter or display controller. The terms "graphics adapter" or "display controller" describe a component, such as a circuit board in a processor, to translate images generated by the corresponding processor into video signals for display on a video wall.

The graphics adapters also manage several display characteristics, such as resolution, color depth, hardware acceleration and video overlay. "Resolution" refers to the number of addressable pixels. For example, a 1280×1024 resolution allows the computer system to address 1280 horizontal pixels and 1024 vertical pixels. More pixels yield greater resolution and detail, which in turn provides smoother lines in an image. The disadvantage of greater resolution is speed; it takes longer to drive a system with larger numbers of pixels.

Color depth refers to the number of bits used to represent the color of a pixel on a screen. A larger number of bits allows a greater number of on-screen colors. Typical color depths are 1, 4, 8, 16 or 24 bits. A single bit only permits black and white, while twenty-four bits permits 16.7 million different colors, considered photographic quality.

Although greater color depth allows use of more colors, the trade-off is again speed. To strike a balance, the preferred embodiment uses palettes with a subset of the 16.7 million colors. A programmer can select a subset, for example 256 ($2^8$), of the total 16.7 million colors. This permits the colors in the palette to be represented by only eight bits, allowing the programmer the speed of an 8-bit color range. The programmer, however, still has a 24-bit color choice.

In the preferred implementation, the graphic adapters would also have hardware acceleration circuitry to help draw shapes such as lines, arcs, and circles, and for effects, such as panning, zooming, and rotating. Hardware acceleration circuitry can also allow transfer of entire bit blocks.

Another desirable feature of the graphic adapters is video overlay. Video overlay permits integrating real-time graphics and text with an analog video signal. Most video overlay systems use a specific color as the key, with the overlaid video replacing the key color in an image.

Graphic adapters can also provide computer-generated animation, such as BITBLTS (bit block transfers), sprite animation, panning, scrolling, and frame animation. Graphic adapters can even provide color animation by changing palettes in response to display changes.

These features are conventional, and persons of ordinary skill in the art can adapt them as necessary. All these features may not be necessary for each implementation, however. Instead, the graphics adapters need include only the features needed for a particular application.

The video signals from the graphics adapters in processors 2105-2140 enter routing switches 2060 and are switched to video wall processors. FIG. 21 shows six video wall processors 2150, 2155, 2160, 2165, 2170, and 2175. In one embodiment, a 20×5 array of monitors would require twenty-five video wall processors, one for every four monitors.

A master control system 2180 preferably connects and synchronizes computer systems 2105-2140. System 2180 also causes processors 2105-2140 to run the appropriate programs at the appropriate times. To do this, master control system 2180 contains a scheduler program and processes to respond to interrupts. The interrupts can be user inputs to generate a particular display or signals from programs monitoring events, such as new index or stock price values. Master control system 2180 also controls routing switches 2060 and video wall processors 2150-2175.

B. System Operation

1. Functions of the System Elements

Figure 22A:
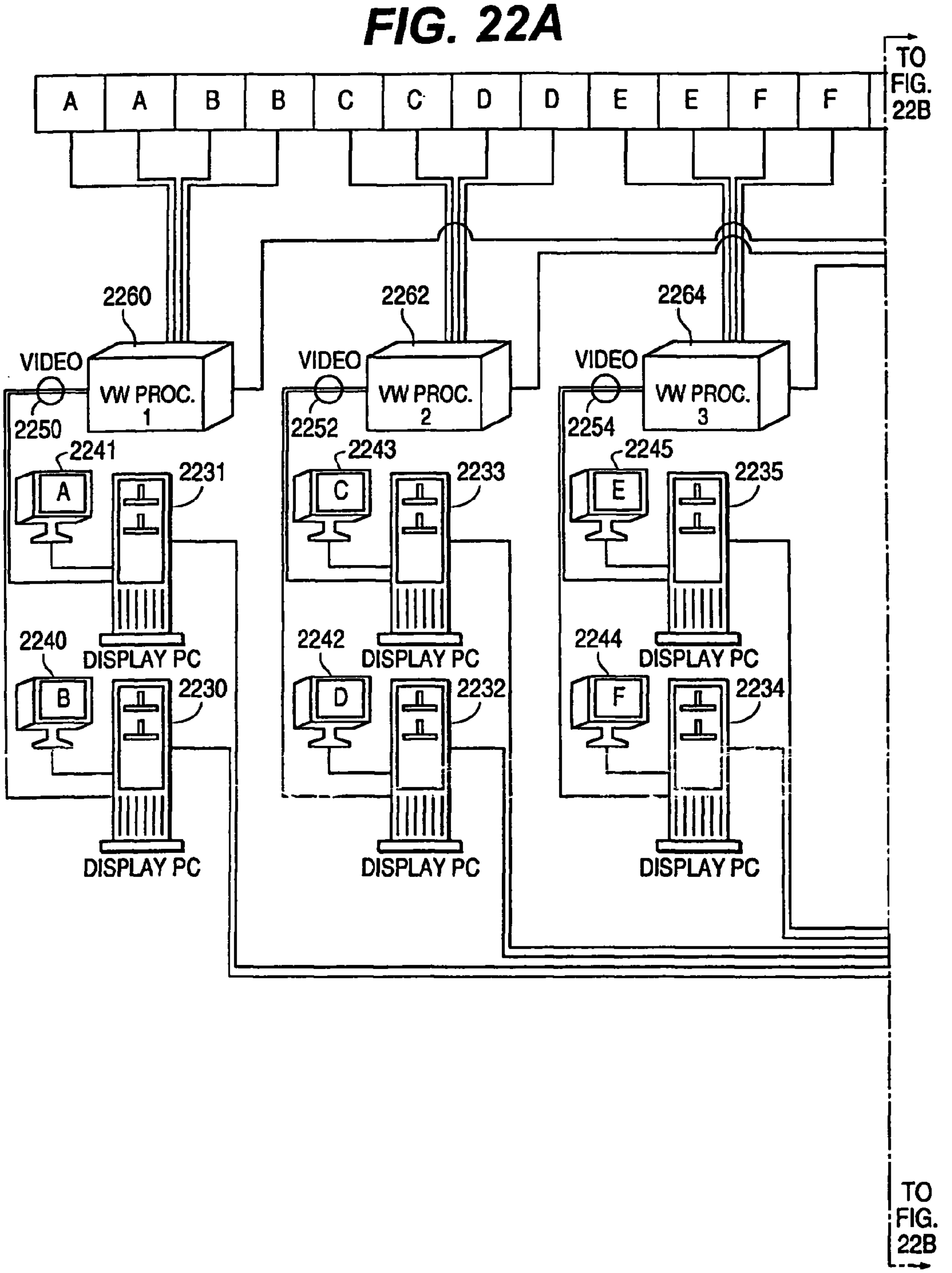
FIG. 22 is a system diagram showing the elements in FIG. 20 in greater detail.
Figure 22B:
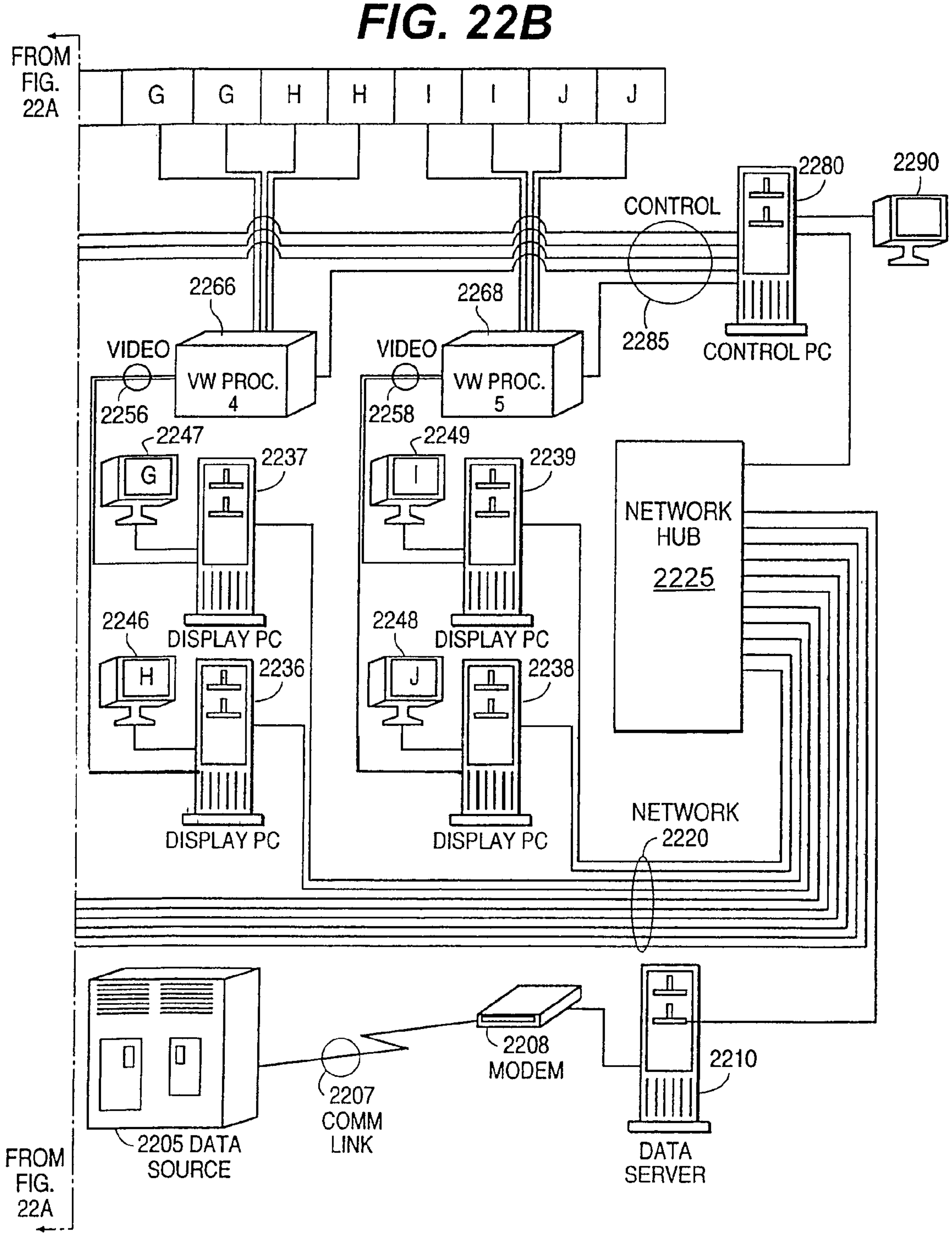

FIG. 22 is a system diagram showing in greater detail the elements in the preferred implementation for providing data to the video wall. Those elements include components of data processing system 2050 (FIG. 20) in greater detail.

Data from an external source 2205 travels over communications link 2207 through a modem 2208 to a data server 2210. Data server 2210 preferably has several input drivers, each corresponding to a different data source. The input drivers receive the data, recognize the data's format, remove transmission information, and extract the needed data. For example, if the input feed is NASDAQ trade data from the NWII, the information transmitted includes an identification of the securities as well as other values, such as the current trading price. A driver would extract (i.e., filter) this information, place it into the proper format, and store it appropriately.

Data server 2210 preferably also contains relational databases to hold the information extracted by the input drivers.

The relational databases preferably allow simultaneous accesses for updating and retrieving data. In addition, the relational databases should have sufficient security features to prevent unauthorized access. Other databases or buffers could also be used depending upon the data type and the manner in which it will be processed and displayed.

Figure 23:
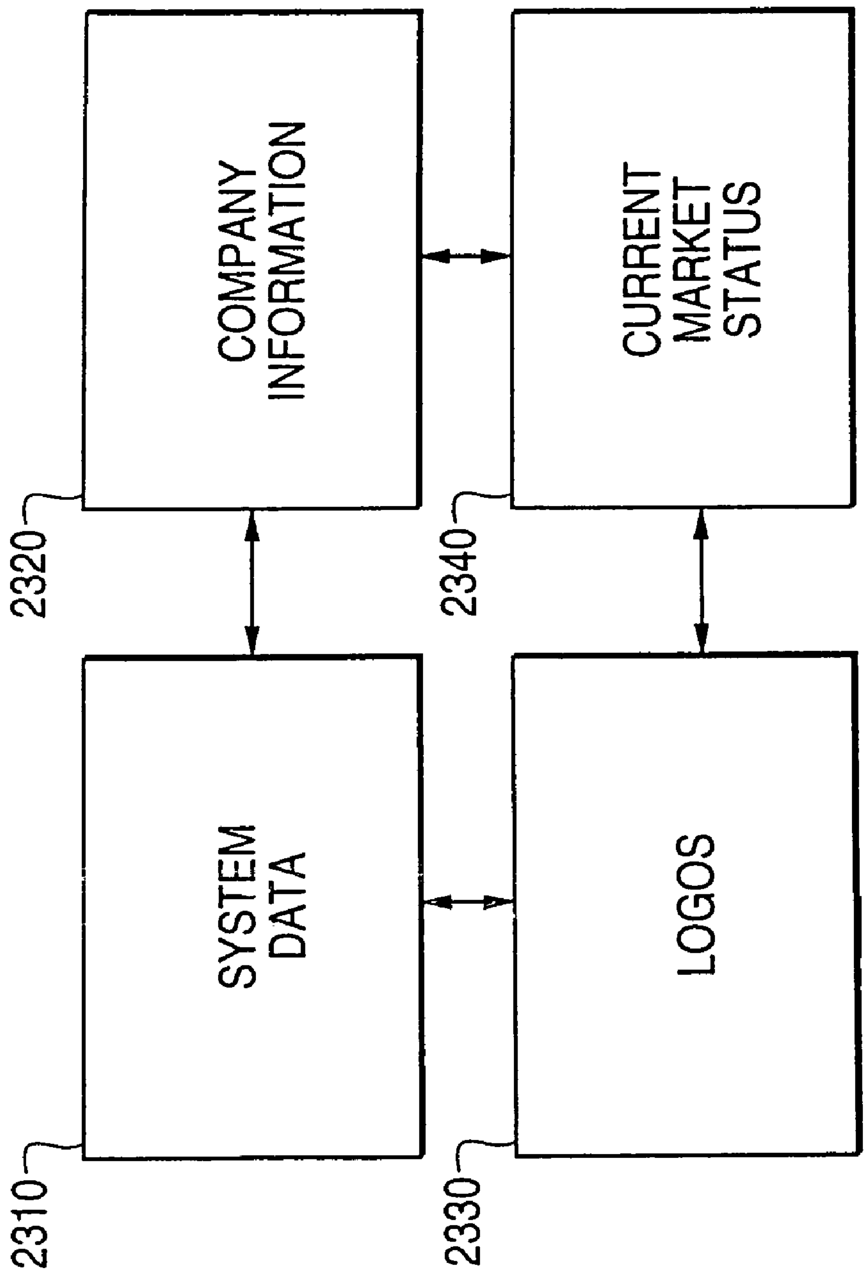
FIG. 23 is a diagram of the databases in the system of FIG. 21.

FIG. 23 shows one possible arrangement of database 2300 in data server 2210. Database 2300, includes four relational databases. Database 2310 contains system data, such as triggers described below. Database 2320 includes information on the companies whose securities are represented on video wall 100. Database 2330 includes the bit maps of the logos of those companies as well as the logos for market makers and any other entities displayed on video wall 100. Database 2340 includes data on the current status of the markets supported by the system.

The data in the databases of data server 2210 preferably include small data elements and BLOBs (Binary Large Objects). Small data elements may be market data from The NASDAQ Stock Market or other sources, such as news services. BLOBs are graphics preferably in standardized file formats, such as TIFF or PCX.

Although data can be distributed over several computer systems, this arrangement is difficult to maintain. A system manager must ensure that all copies are the same and equally valid. The preferred implementation centralizes storage and avoids delays from simultaneous requests by using a sufficiently robust relational database accessed by standard calls, such as SQL or ODBC calls.

Preferably, data server 2210 connects to a network 2220 managed by a network hub 2225. Network 2220 and network hub 2225 may include standard LAN equipment allowing data server 2210 to communicate with the other data processing elements shown in FIG. 22.

Those other data processing elements include display data processors 2230, 2231, 2232, 2233, 2234, 2235, 2236, 2237, 2238, and 2239. These display data processors contain graphics adapters and form the actual video displays for the different areas shown in FIG. 1.

Each display data processor preferably includes a corresponding monitor 2240, 2241, 2242, 2243, 2244, 2245, 2246, 2247, 2248, and 2249, respectively. The principal purpose of those monitors is to show the video output generated by the corresponding computer systems. System operators can also use the monitors to control the corresponding data processor.

In the preferred implementation, the display data processors fetch the information for display from data server 2210. For example, if display data processors 2230-2239 are displaying a stock ticker, those data processors would retrieve from data server 2210 financial instrument information including identifiers and trade information. Using the identifiers, display data processors 2230-2239 then fetch from data server 2210, or from some other storage mechanism, a bit map for the corporate logo associated with the identifier for a particular security. The bit map would represent the logo of the corporation that issued the security. For example, MCI Corporation could have the stylized letters MCI or Sun Corporation could have the graphic representation of a cube with the stylized letters "SUN." Display data processors 2230-2239 would then combine bit maps with the associated trade information and create a video output of the stock tickers.

In another implementation, data server 2210 could automatically correlate a bit map database with the relational database containing trade information. When display data processors 2230-2239 requested information, data server 2210 would send the bit maps with the trade information.

After display data processors 2230-2239 retrieve the needed data, they format that data into the desired output display, such as those in FIGS. 2, 3 and 5-18. Each output display would have its own formatting program. Persons of ordinary skill could construct such programs from the requirements for that display. Standard tools are available to expedite constructing the displays.

Graphics adapters in display data processors 2230-2239 preferably create outputs in VGA format using a standard video output similar to the video signals from, for example, cable feeds, television feeds or VCRs. These outputs feed routing switches 2250, 2252, 2254, 2256, 2258, which in turn provide the outputs to video wall processors, 2260, 2262, 2264, 2266, 2268, respectively. As explained previously, video wall processors 2260-2268 change the aspect ratios and the sizes of the displays and provide other processing for the associated monitors in video wall 2270.

In a preferred embodiment, each display data processor 2230-2239 corresponds to two monitors in video wall 2270, and each video wall processor 2260-2268 can control four monitors. This organization, however, is a design choice that a person of ordinary skill in the art can adjust according to different needs.

A master control computer system 2280 connects to display data processors 2230-2239 through LAN 2220 and network hub 2225, and connects to video wall processors 2260-2268 through a control bus 2285. The master control computer system 2280, shown as a single computer for illustration, synchronizes video processors 2260-2268 and display data processors 2230-2239, and schedules the formatting programs that display data processors 2230-2239 execute at specified times.

Although static displays need little synchronization, dynamic displays, such as scrolling, need extensive synchronization. For example, the preferred implementation of a scrolling stock ticker uses several horizontally adjacent monitors. Each display data processor 2230-2239 controls the scrolling across its associated monitors, but master control computer system 2280 supervises scrolling between monitors. To accomplish this operation in the preferred implementation, display data processors 2230-2239 for adjacent monitors all construct the same display. Control computer system 2280 then causes processors 2230-2239 to start generating the displays at fixed intervals to create the effect of images scrolling across video wall 2270.

Instead of this technique, display data processors 2230-2239 could use BITBLT, sprite, or full screen frame animation in their graphics adapters to produce scrolling. Control computer system 2280 would still be involved for synchronization.

Figure 24:
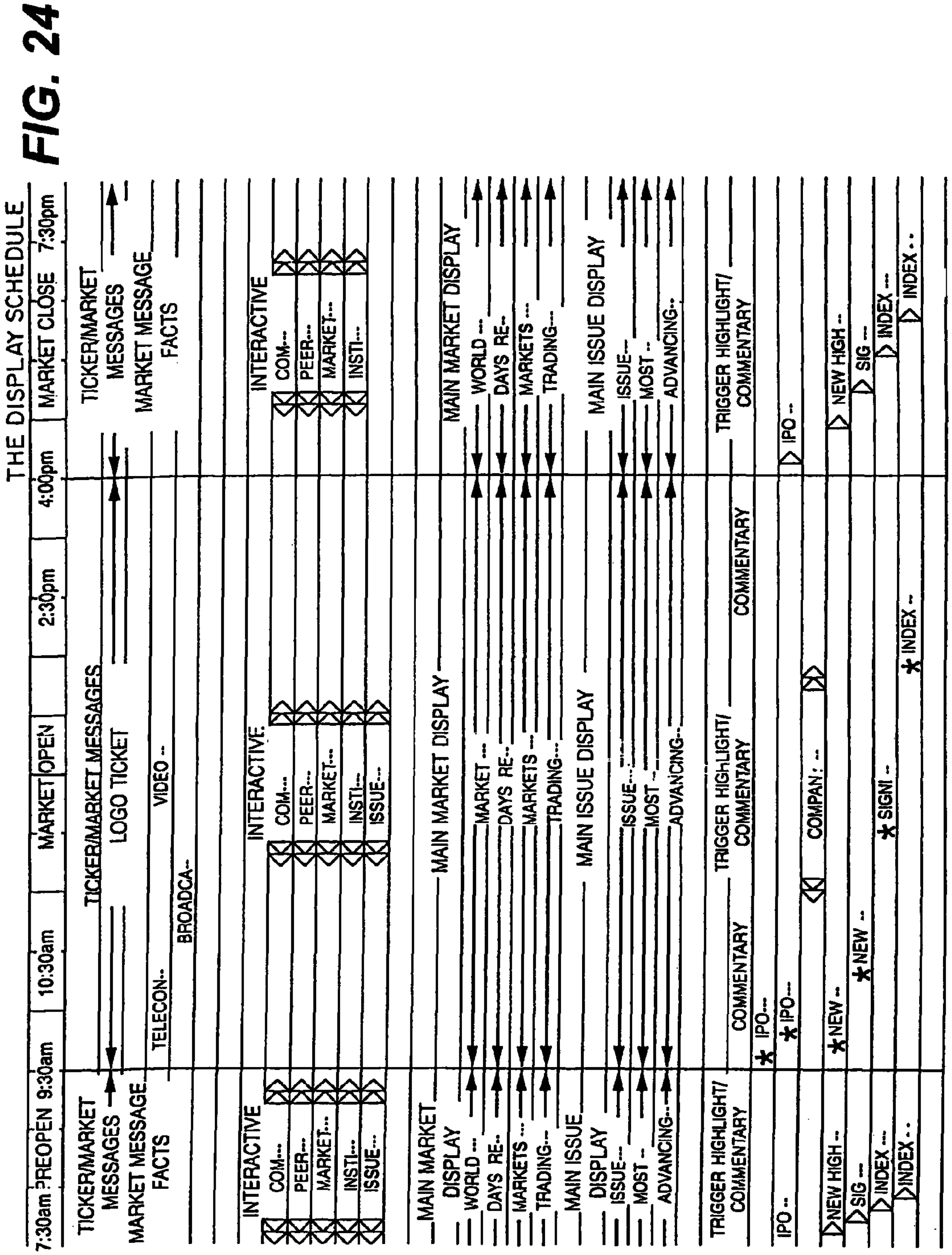
FIG. 24 is a diagram of a schedule for the operations of the system in FIG. 20.

As explained above, control computer system 2280 preferably stores a schedule indicating which displays appear on which portions of video wall 2270 during each time period. FIG. 24 shows a representation of such a schedule. Typically, an internal timer regularly interrupts control computer system 2280 and causes it to check the schedule. To change a display, master control computer system 2280 sends messages telling the appropriate display data processors 2230-2239 to construct a new display, and telling routing switches 2250 to route those displays to the appropriate area of video wall 2270.

In addition, the master control computer system 2280 is preferably coupled to a user input station 2290 to allow a user to change the displays on video wall 2270. For example, if a CEO would like to see information about his company, he could select certain displays at input station 2290. In response, master control computer system 2280 would direct display data processors 2230-2239 to generate those displays, and would direct routing switches 2250 to place those displays on the appropriate areas of video wall 2270.

Control computer system 2280 can also respond to other interrupts to change the schedule of displays. For example, if a monitoring program on master control computer system 2280 finds that a trigger has occurred, such as an index or a stock price reaches a new high, system 2280 changes the display on video wall 2270 according to some pre-programmed format. Control computer system 2280 can also control the video routing switches to route live TV or stored video to reflect breaking news.

Figure 25:
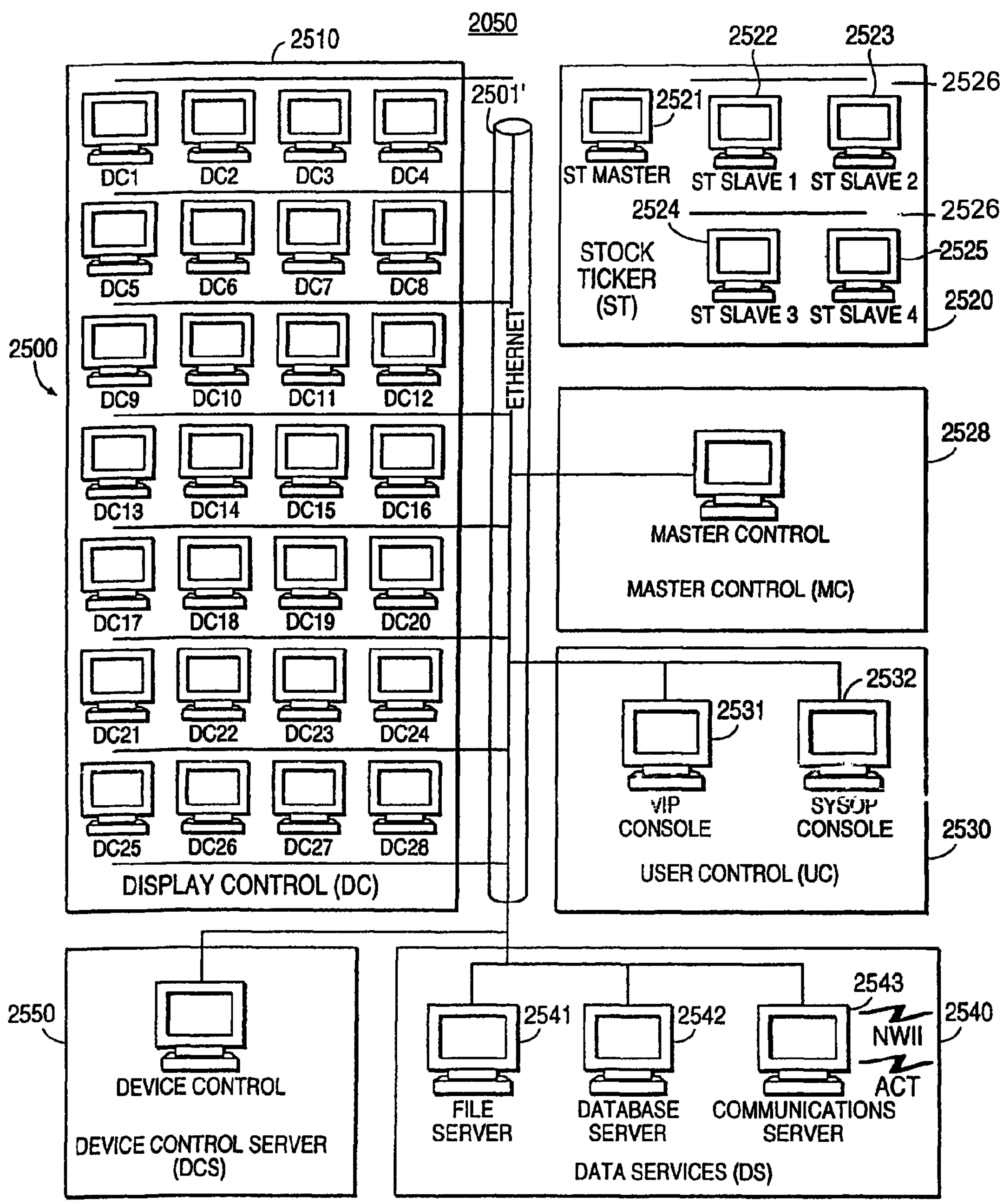
FIG. 25 is a block diagram of an alternate data processing system shown in FIG. 20.

FIGS. 25 through 30 show a slightly different embodiment for the hardware implementation of this invention. FIG. 25 shows data processing system 2050 that includes a local area network 2500, including an Ethernet backbone, called a User-Net Lan 2501, coupling several computers together. Display control 2510, which is shown for illustration purposes only as including twenty-eight separate computers, is responsible for displaying all the charts and graphs except the stock ticker.

Stock ticker system 2520 includes a stock ticker master computer 2521 coupled to four stock ticker slave computers 2522, 2523, 2524, and 2525 via Lan 2526. Stock ticker system 2520 continuously scrolls market data across monitors at the top of the video wall 2270.

In stock ticker system 2520, stock ticker master computer 2521 controls the system and receives information which it then translates into a graphic image that, as described above, preferably includes a company logo and a stock quote. To do so, stock ticker master computer 2521 reads the stock data, retrieves the proper graphics image data from storage, assembles and compresses the image, and transfers the compressed data to slave computers 2522-2525.

Those slave computers receive the compressed data and decompress it using an off-screen video buffer. Each slave computer then transfers the data in its buffer to a neighboring slave computer to effect scrolling.

Each slave computer preferably supports a display area with 1024×768 image. The image is divided into quadrants and split between four separate monitors on the video wall 2270. Thus, the four slave computers can generate a stock ticker across sixteen monitors.

Controller 2528, like control computer system 2280, controls the other computer systems in FIG. 25. Controller 2528 runs the pre-defined scripts that determine what content to place on the video wall at what time. Controller 2528 also causes the appropriate content to be placed on the proper portions of video wall 2270 in response to market events or triggers and live user commands from a user console 2530.

Controller 2528 in essence runs only one application, but that application does not control how those displays are formed. Instead, it assigns tasks to other devices, such as a display controller 2510, synchronizes the computers according to the schedules and market events, and controls the appropriate router. Importantly, controller 2525 knows what all the other computers in the system are doing.

User console 2530 includes a VIP console 2531 and SYSOP console 2532. VIP console 2531 is preferably a computer with a touch-screen input to allow non-technical users, such as CEOs, access to video wall 2270. SYSOP console 2532 is used by the system operator or other technical personnel to correct technical problems, create content for the wall, and perform maintenance.

File server 2540 preferably includes a file server computer 2541, a database server 2542, and a communications server 2543. File server 2541 contains a copy of all executable programs on the system. Database server 2542 supplies the rest of the system with local data, such as logo bit maps, messages, schedules, and scripts. Communications server 2543 receives market data, such as from the NWII, or the ACT, and translates that data into an appropriate form for use by the display control computers 2510, the stock ticker system 2520, and the master controller 2528.

Communications server 2543 runs an application to provide market data to the other computers by requesting and monitoring data from the market data feeds and storing this data locally. The modules included to do these functions include request arbitration procedures, ACT feed handlers, NWII feed handlers, and historical feed handlers.

Database server 2542 has a request processing module handling and data distribution procedures, and a trigger processing module to manage trigger objects and control trigger events. There are also data specific modules, such as procedures for retrieving specific data, handling specific triggers, and managing specific data, and database management modules, such as interfaces to SQL ODBC, file management, error and fault handling, and log history and status procedures.

Device control server 2550 controls the serial devices described below. To do so, device control server 2550 includes client management procedures, configuration management procedures for the different devices, virtual video wall management procedures, and device drivers.

Figure 26:
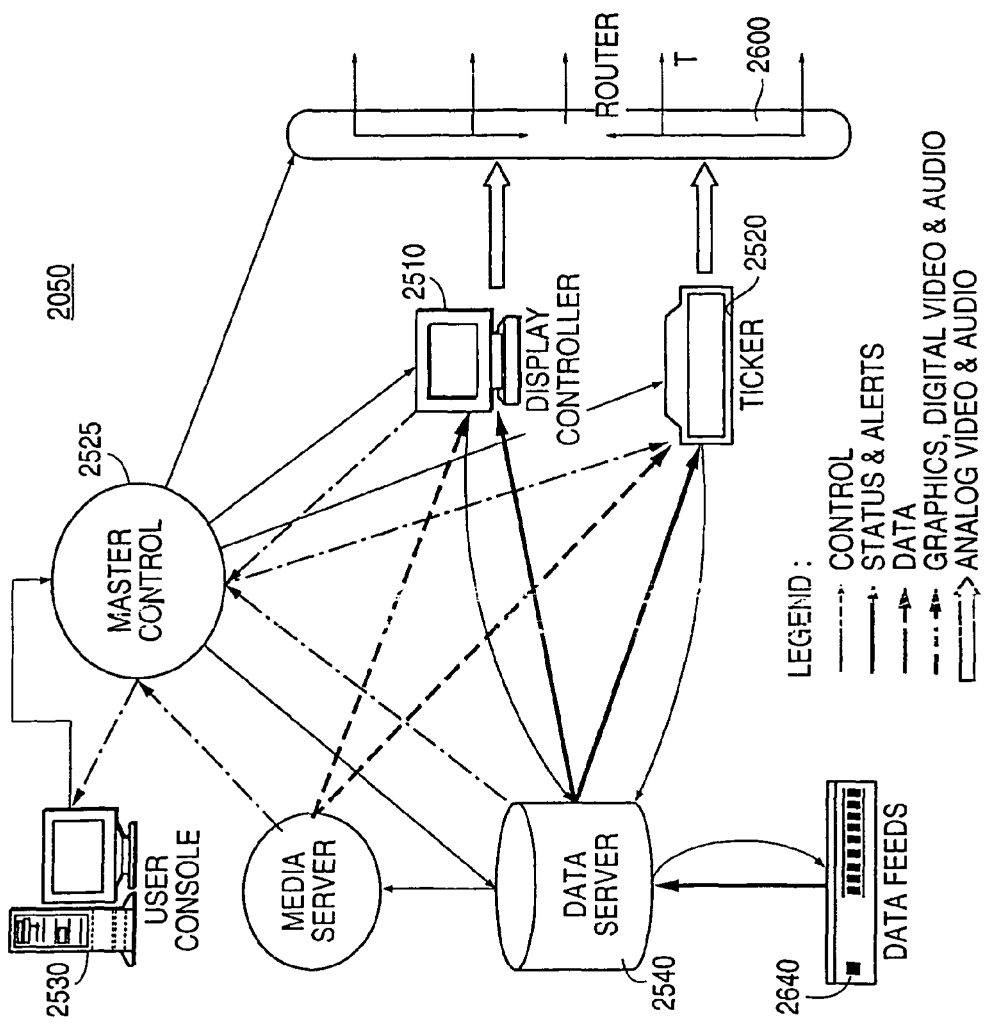
FIG. 26 is a diagram showing the data flow between the systems in FIG. 25.

Before describing each of these systems in greater detail, however, reference is made to FIG. 26 to show the data flow between the systems. The elements in FIG. 26 that have the same reference numbers as elements in FIG. 25 represent the same elements and will not be described again. FIG. 26 also shows a router 2600 which corresponds to routing switches 2250. In addition, Media server 2620 is a system that could be used to stored media information. Data feeds 2640, such as modems or other communication devices, provide the inputs into the data server 2540. User console 2530 is also shown as including an authoring system, discussed in greater detail below.

Data processing system 2050 sends three types of messages: control, status/alert, and data. Control messages include command instructions, such as when the master controller 2528 instructs the display controller 2510 to display a certain chart. Status/alert messages include error, warning, and informational messages, such as when the device controller 2510 advises SYSOP console 2532 in user console 2530 that someone has removed a disk from a laser disk player. Data messages are market data that drive displays.

Control messages can come from a scheduled script, a user console request, or a specific trigger. In each case, controller 2528 receives a control message from another computer on the system. A scheduled script comes from the current wall schedule running on SYSOP console 2532 in user console 2530. A user console request comes from either VIP console 2531 or from SYSOP console 2532 as a result of user input. A trigger is usually generated by the communications server 2543 in data server 2540 when a significant market event occurs.

When controller 2528 receives a control message, it responds by sending control messages to other computers in the systems, such as to the communications server 2543 in data server 2540 (for example to set-up triggers), to device controllers 2550 (for example to play a certain laser disk player), to display controller 2510 (for example to display a certain chart), and to stock ticker system 2520 (for example to display a message or select certain stocks).

Display controller 2510 and stock ticker 2520 both require market data based on the content they are displaying. They therefore send control messages to communications server 2543 in data server 2540 to request certain data at a certain frequency.

When a computer must report some items, it sends status and alert messages. These messages provide information, such as reporting a successful loading of a chart, or report errors, such as indicating the removal of a disk player. Master controller 2528 receives all status and alert messages to see if the software can work around the problem, and sends status/alert messages to SYSOP console 2532 in user console 2530 if a system operator needs to intervene.

Data messages contain the market data that is supplied to the display controllers 2510 and to the stock ticker system 2520 by communications server 2543 in data server 2540. As explained above, database server 2542 and file server 2541, both in data server 2540, also provide local data services.

Figure 27A:
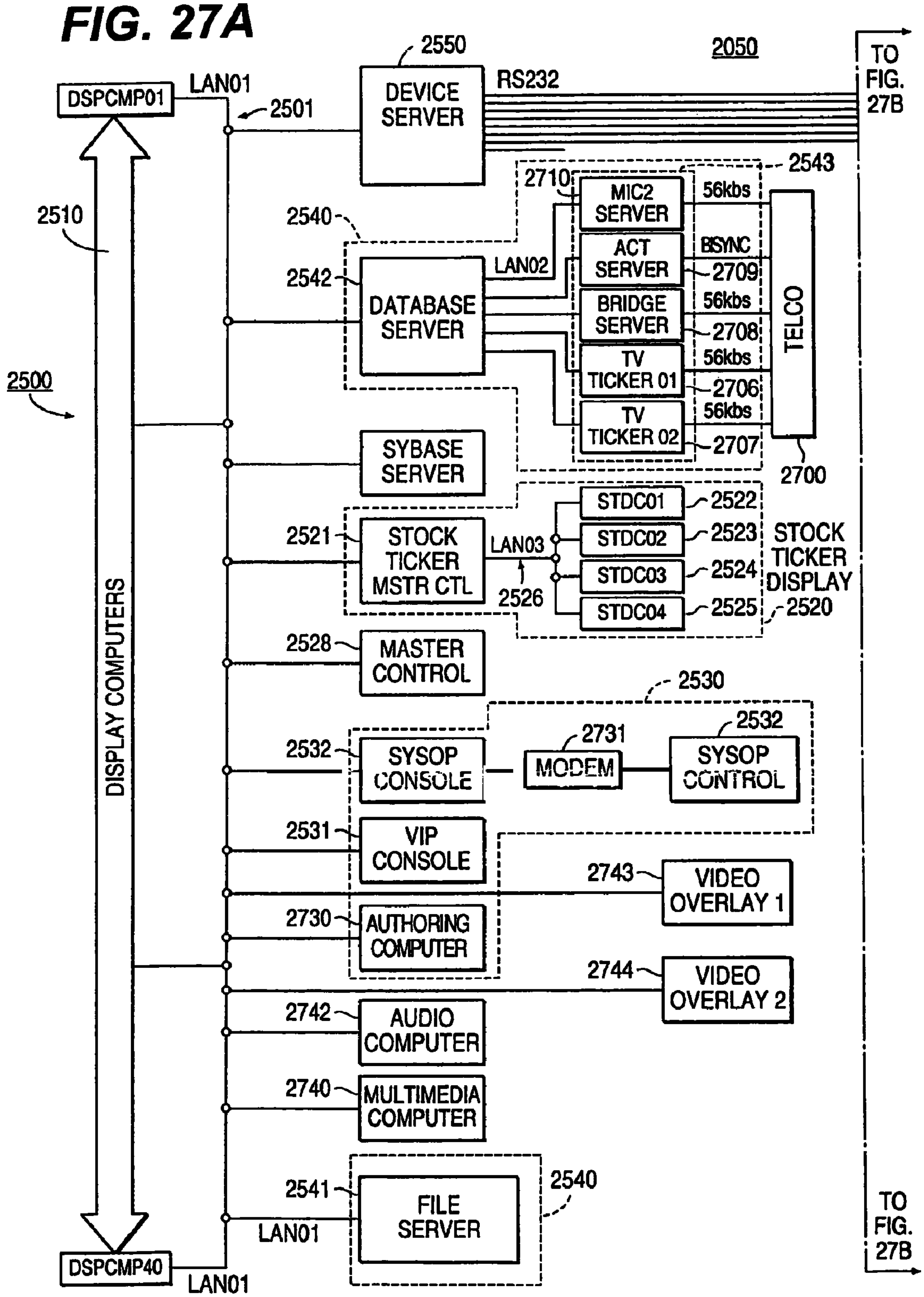
FIG. 27 is a detailed block gram the data processing facility of FIG. 25.
Figure 27B:
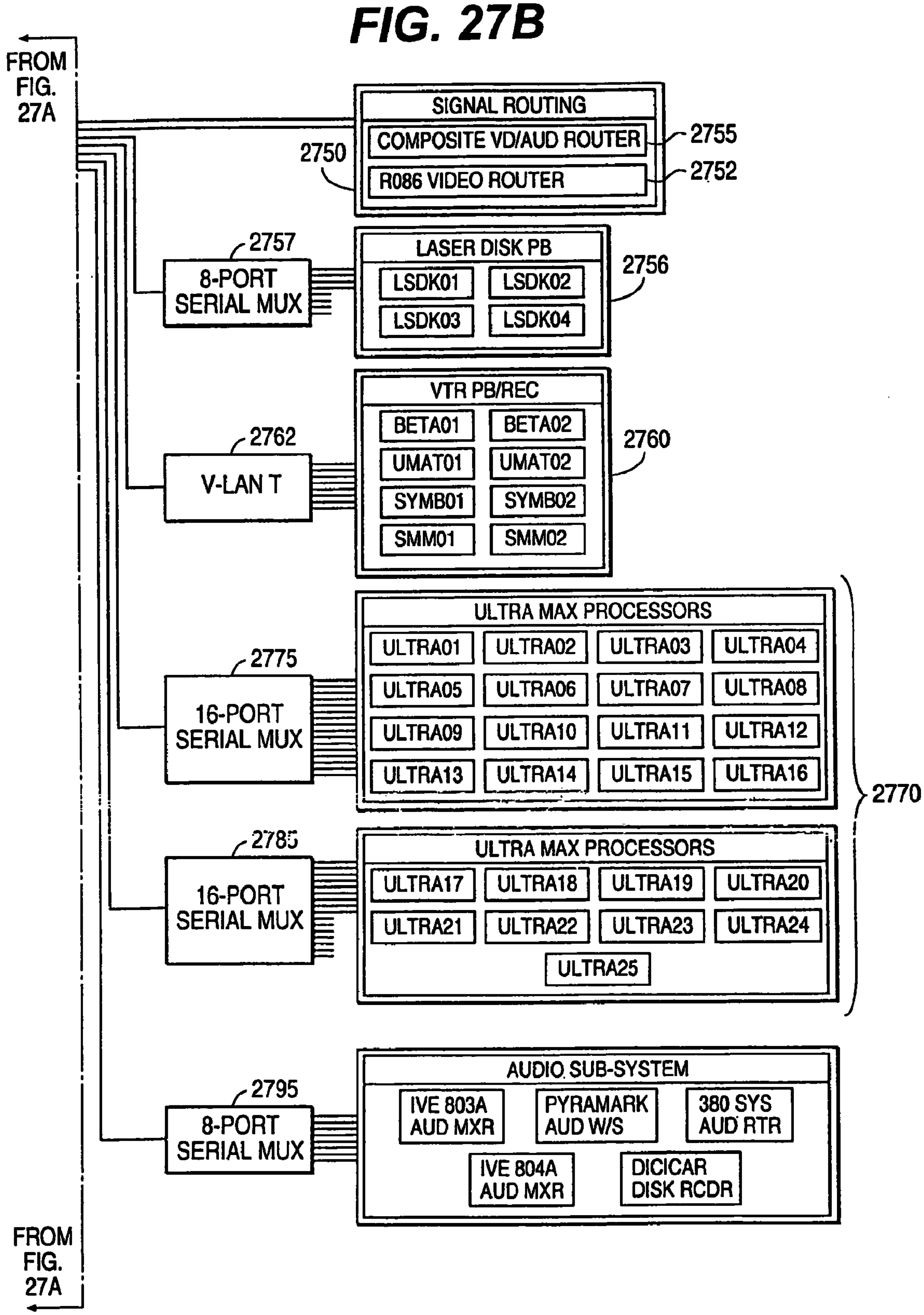

FIG. 27 shows the data processing facility 2050 in greater detail. As can be seen, many of the elements shown in FIG. 25 are repeated with the same reference numerals. UserNet Lan 2501 again connects display controllers 2510, stock ticker system 2520, user console 2530, data services system 2540, and device controller 2550. Communications server 2543 is shown in greater detail as including five separate servers: TV ticker servers 2706, and 2707, bridge server 2708, ACT server 2709, and NWII server 2710. All of the inputs into those servers come from modems 2700 connected to telephone lines. TV ticker servers 2706 and 2707 receive TV signals. Bridge server 2708 receives Bridge Dow Jones news. ACT server 2709 receives ACT signals, and NWII server 2710 receives the NASDAQ feed.

User console 2530 is shown as also including an authoring computer 2730 that can be used to generate additional scripts and displays. SYSOP console 2532 is connected via modem 2731 to a SYSOP control 2732 that can be remote from the location of the remainder of the system.

Multimedia computer 2740 controls multimedia displays. Audio computer 2742 controls the audio data, and video overlay computers 2743 and 2744 control video signals.

Device server 2550 is shown connected to several different types of devices. One is the signal routing system 2750 that controls routing switches 2250. Included in those routing switches are an RGBS video router 2752 and a composite video audio router 2755.

Other devices are laser disk playback device 2756 controlled through a 8-port serial multiplexer 2757, and video tape recorder playback record system 2760 controlled through a V-LAN T-switch 2762. In addition, display processors 2770 correspond to display data processors 2230-2239 and communicate through 16-port serial multiplexers 2775 and 2785. Audio subsystem 2790 communicate through 8-port serial multiplexer 2795.

Figure 28A:
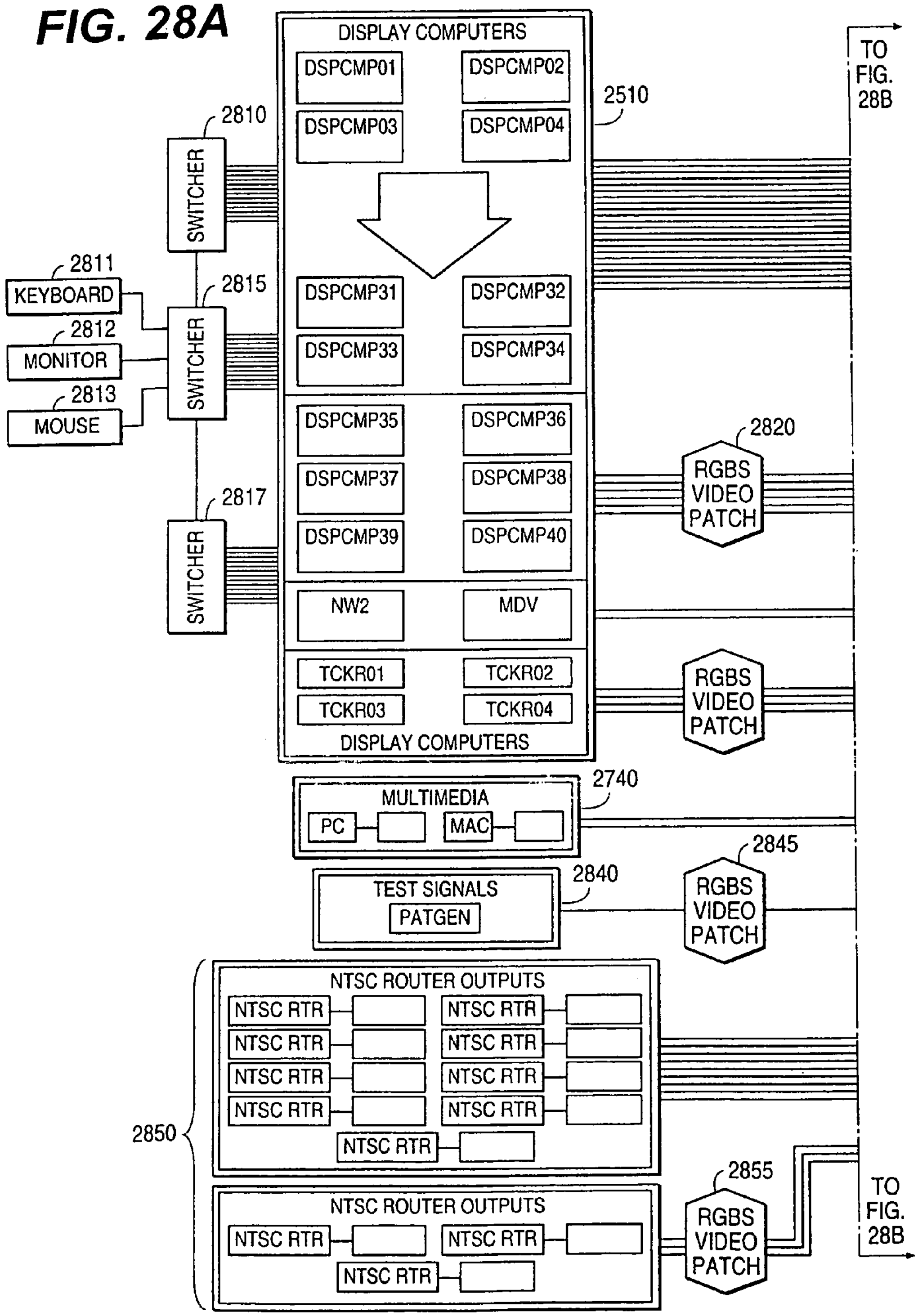
FIG. 28 is a block diagram of the RGBS signal routing in the data processing system of FIG. 25.
Figure 28B:
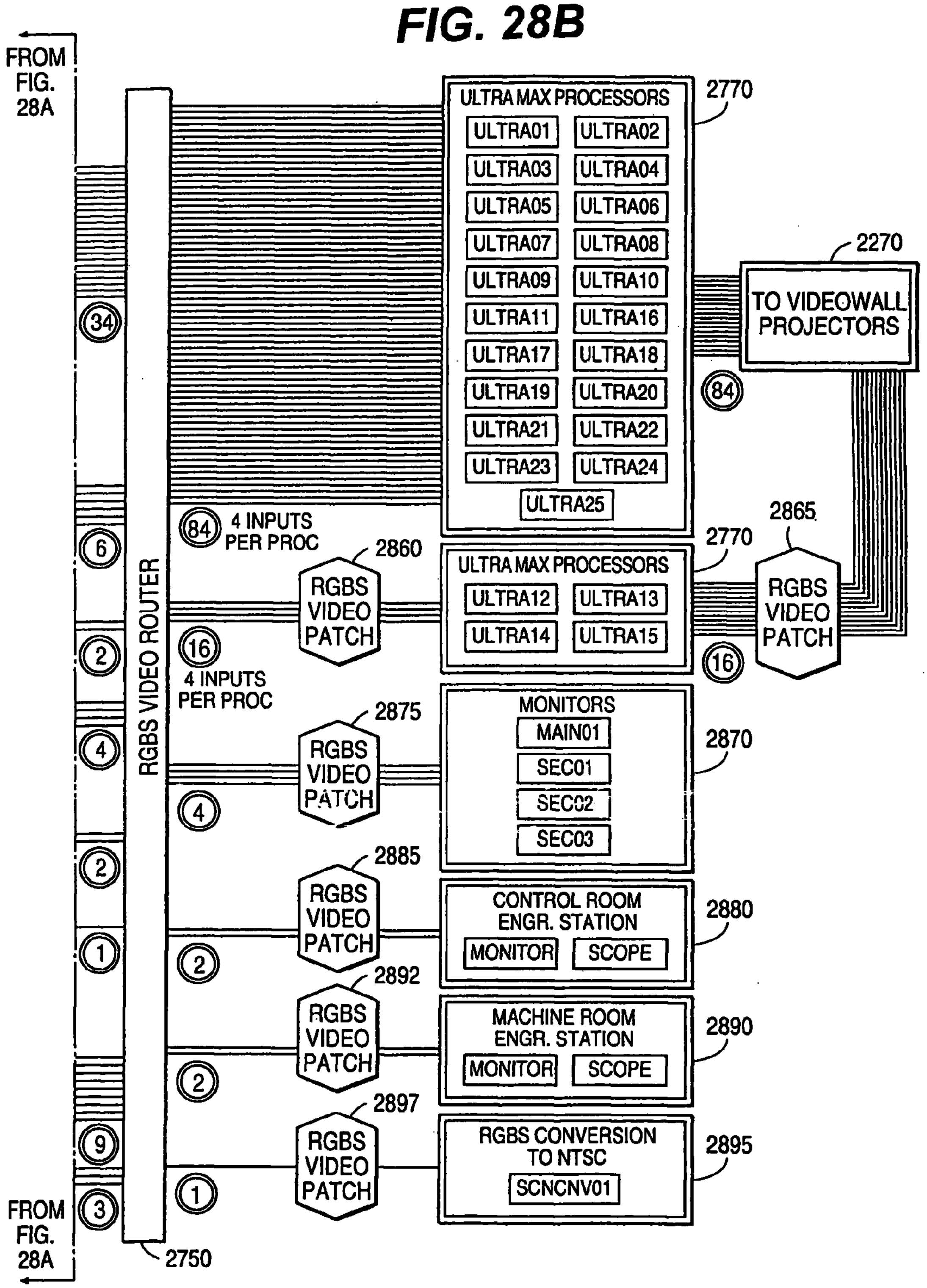

FIG. 28 shows a block diagram of a system for routing the RGBS signals. In a preferred embodiment, the system in FIG. 28 has 61 RGBS inputs and 109 RGBS outputs.

RGBS video router 2750, shown in FIG. 27, forms the heart of this system. Signals fed to router 2750 include outputs from display computer 2510.

Display computer 2510 may interact with peripheral devices. Such devices include one or more keyboards 2811, one or more monitors 2812, and one or more mouses or other pointing devices 2813. All of these devices connect to switchers 2810, 2815 and 2817 that allow the devices to interact with any of the display computers 2510. Certain of the display computers 2510 also connect through an RGBS video patch 2820 to provide for manual connection in case of electrical failure. Test signals may be generated in test signal subsystem 2840. These signals connect to router 2750 via patch 2845.

Multimedia computer 2740 (FIG. 27), which can include both Intel-based PCs and Apple MacIntoshs, also connect to router 2750. In addition, video signals can come from NTSC router outputs 2850 that connect to router 2750 either directly or through video patch 2855.

Video router 2750 sends signals to the ULTRAMAX display processors 2770, both directly and, in certain cases, through video patch 2860. Processors 2770 send their outputs to the video wall 2270, again both directly and through video patch 2865.

Router 2750 also sends signals to monitors 2870 in a control room through video patch 2875, and sends signals to a control room engineering station 2880 which includes both a monitor and a scope through video patch 2885. In addition, router 2750 sends signals through video patch 2892 to a machine room engineering station 2890. Finally, router 2750 sends signals to an RGBS Conversion II NTSC system 2895 through video patch 2897.

Figure 29A:
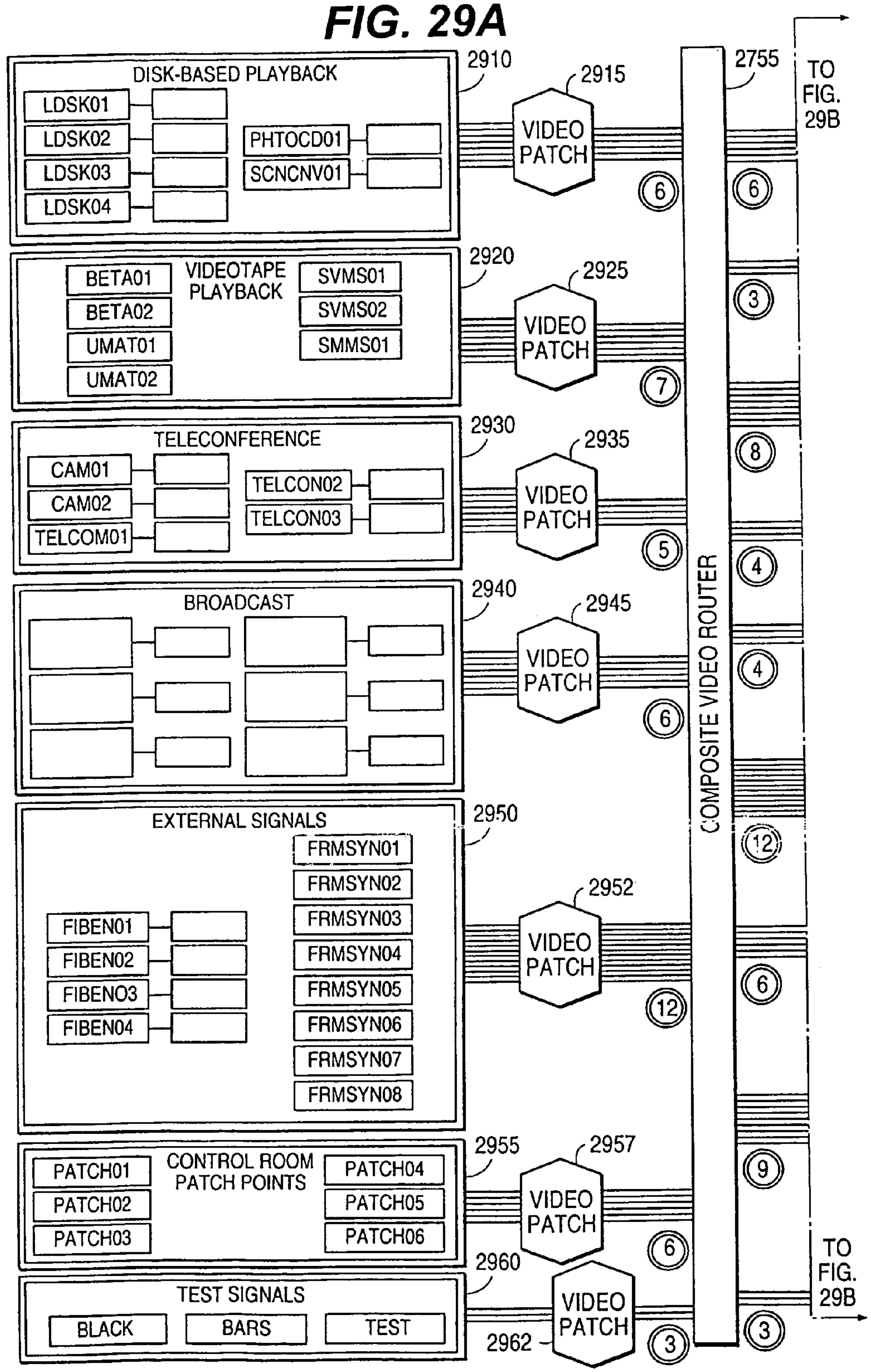
FIG. 29 is a block diagram of the video signal routing in the data processing system of FIG. 25.
Figure 29B:
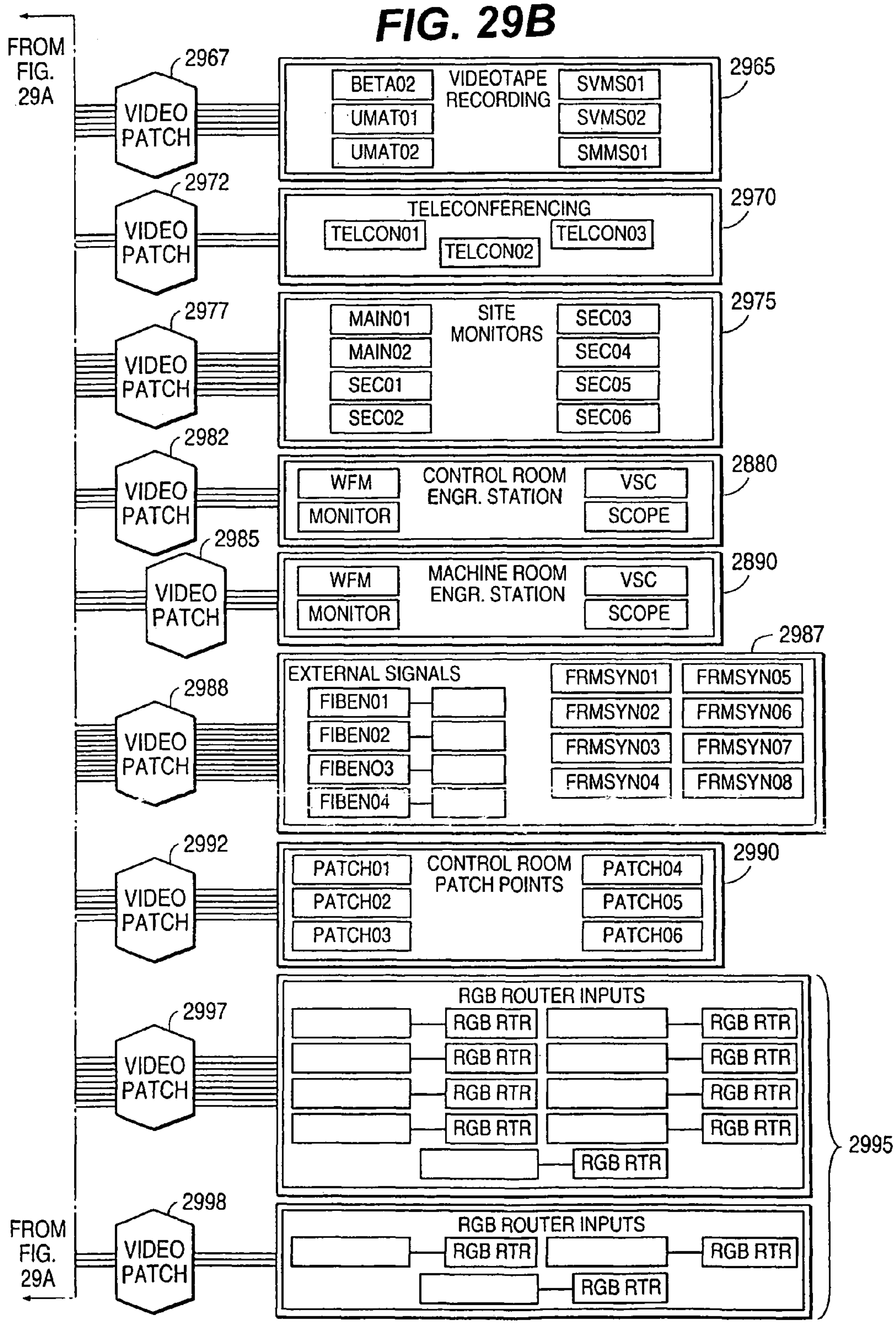
Figure 30A:
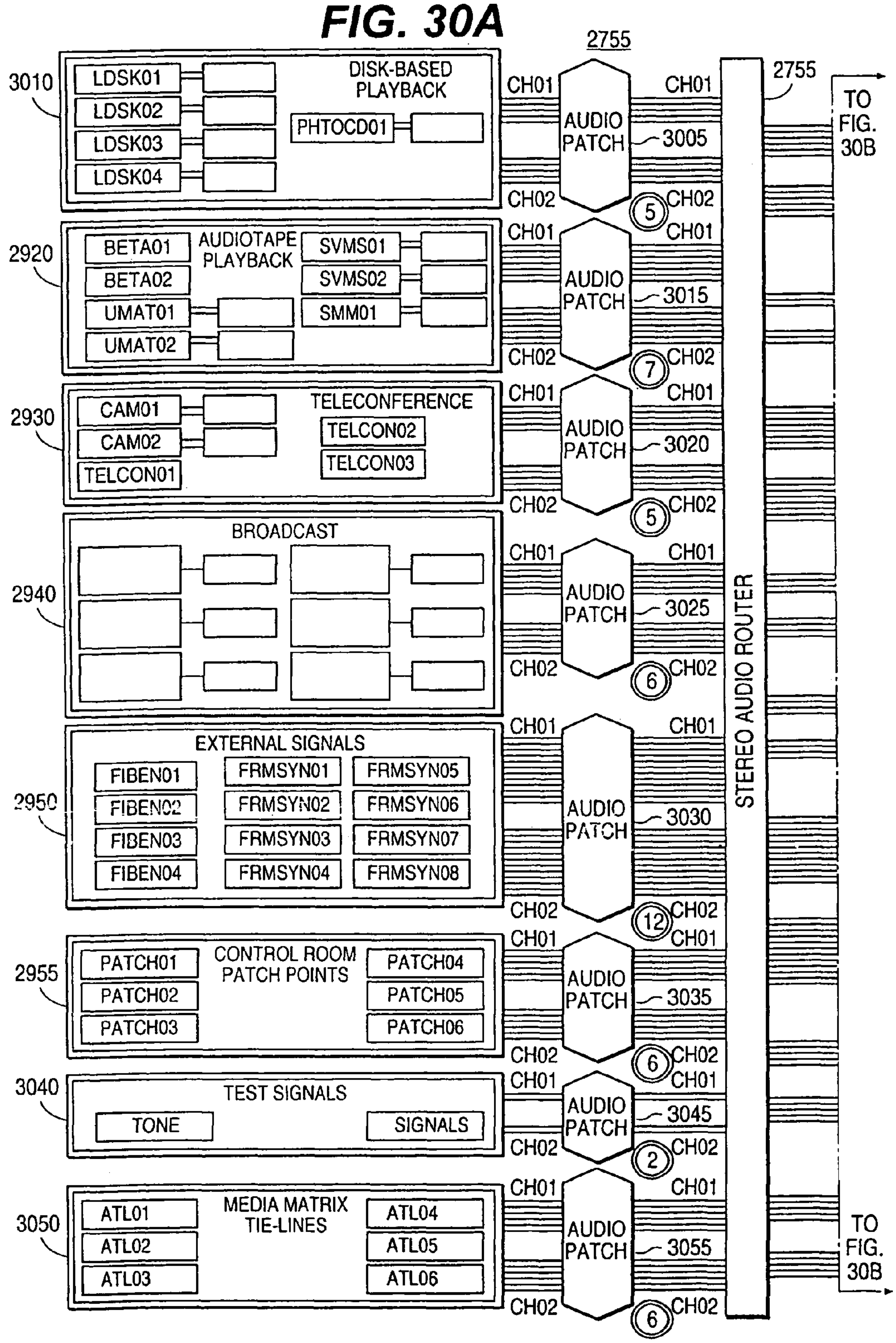
FIG. 30 show is a block diagram of the audio signal routing in the data processing system of FIG. 25.
Figure 30B:
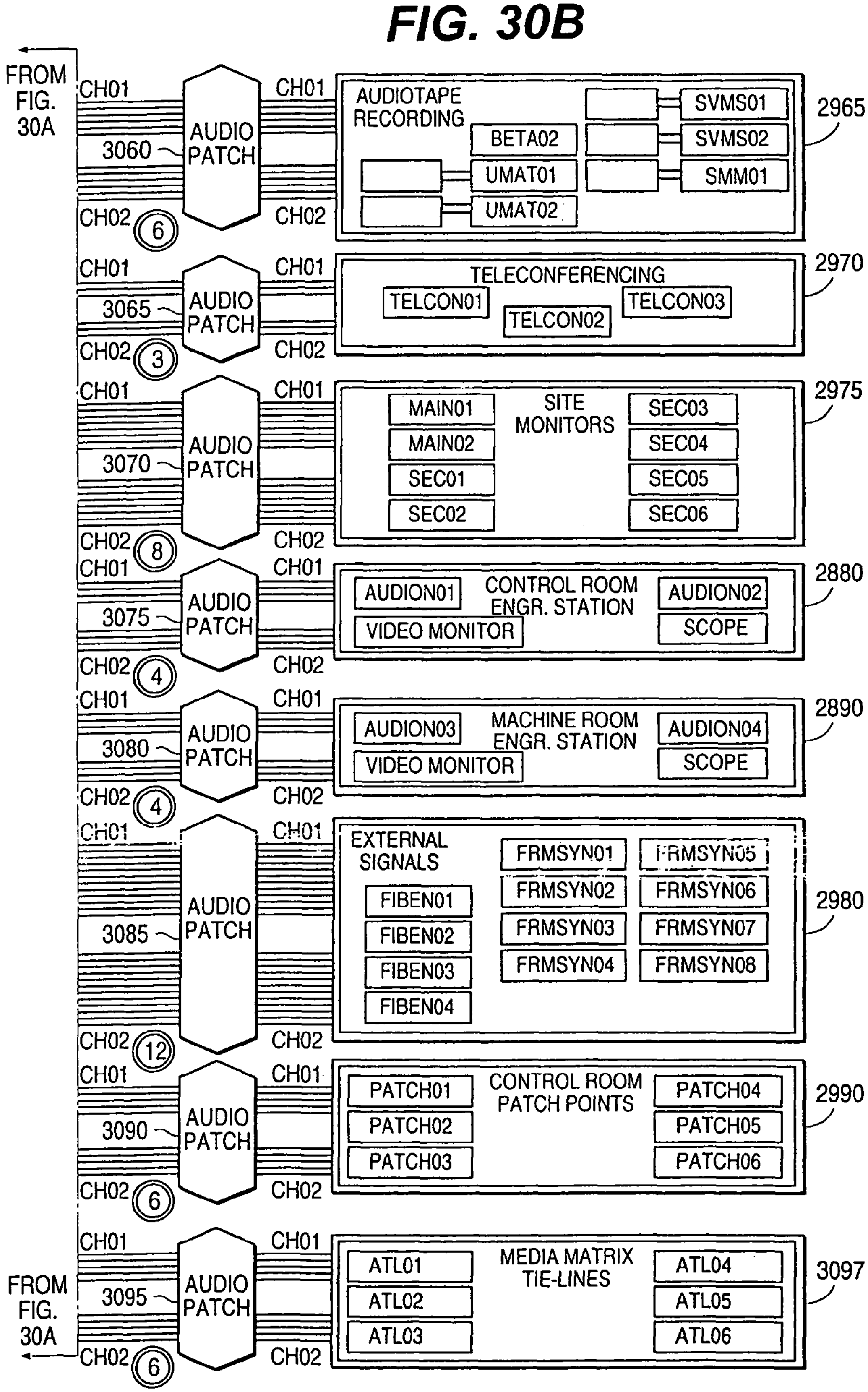

FIGS. 29 and 30 show details of the composite video/audio router 2755 and its connections. In FIG. 29, disk-based playback 2910 connects through a video patch 2915 to router 2755, and videotape playback 2920 connects through video patch 2925 to router 2755. In addition, teleconference inputs 2930 connect through video patch 2935 to router 2755, and broadcast inputs 2940, such as from the broadcasting cable networks, connect through video patch 2945 to router 2755.

The system can also receive several external signals 2950, such as fiber-optic signals or frame synchronization signals. These connect through video patch 2955 to router 2755. For troubleshooting and system control, there are also a number of control room patch points 2955 that connect through video patch 2957 to router 2755, and test signals 2960, such as black, bar, or other test signals, that connect through video patch 2962 to router 2755.

Also connected to router 2755 are video tape recording apparatus 2965 that connect through video patch 2967, and teleconferencing outputs 2970 that connect through video patch 2972. For control and maintenance, site monitors 2975 connect to router 2755 through video patch 2977, a control room engineering station 2980, shown in FIG. 28, connects to router 2755 through video patch 2982, and a machine room engineering station 2890, also shown in FIG. 28, connects to router 2755 through video patch 2985.

This system can also provide external signals 2987 through video patch 2988 from router 2755, and there are several patch points 2990 that connect to router 2755 through patch 2992. Finally, RGB router inputs 2995 connect to router 2755 via video patches 2999 and 2998.

FIG. 30 shows how router 2755 routes audio signals to and from many of the same devices shown in FIG. 29. For example, audio signals from the disk-based playback 2910, videotape playback 2920, teleconference 2930, and broadcast inputs 2940 connect to router 2755 through audio patches 3005, 3015, 3020 and 3025, respectively. In addition, external signals 2950 and control room patch points 2955 connect to router 2755 through audio patches 3030 and 3035, respectively.

Test signals 3040, which can be tones or other test signals, connect to router 2755 through audio patch 3045. Media matrix tie-lines 3050 connect to router 2755 through audio patch 3055.

Videotape recording apparatus 2965, teleconferencing outputs 2970, and site monitors 2975 (FIG. 29) connect to router 2755 through audio patches 3060, 3065, and 3070, respectively. In addition, control room engineering station 2880 and machine room engineering station 2890 (FIG. 28) connect to router 2755 through audio patches 3075 and 3080, respectively.

External signals 2988 and control room patch points 2990 (FIG. 29) connect to router 2755 through audio patches 3085 and 3095, respectively. Finally, media matrix tie-lines 3097 connect to router 2755 through audio patch 3095.

2. Functions of the Software Elements

Figure 31:
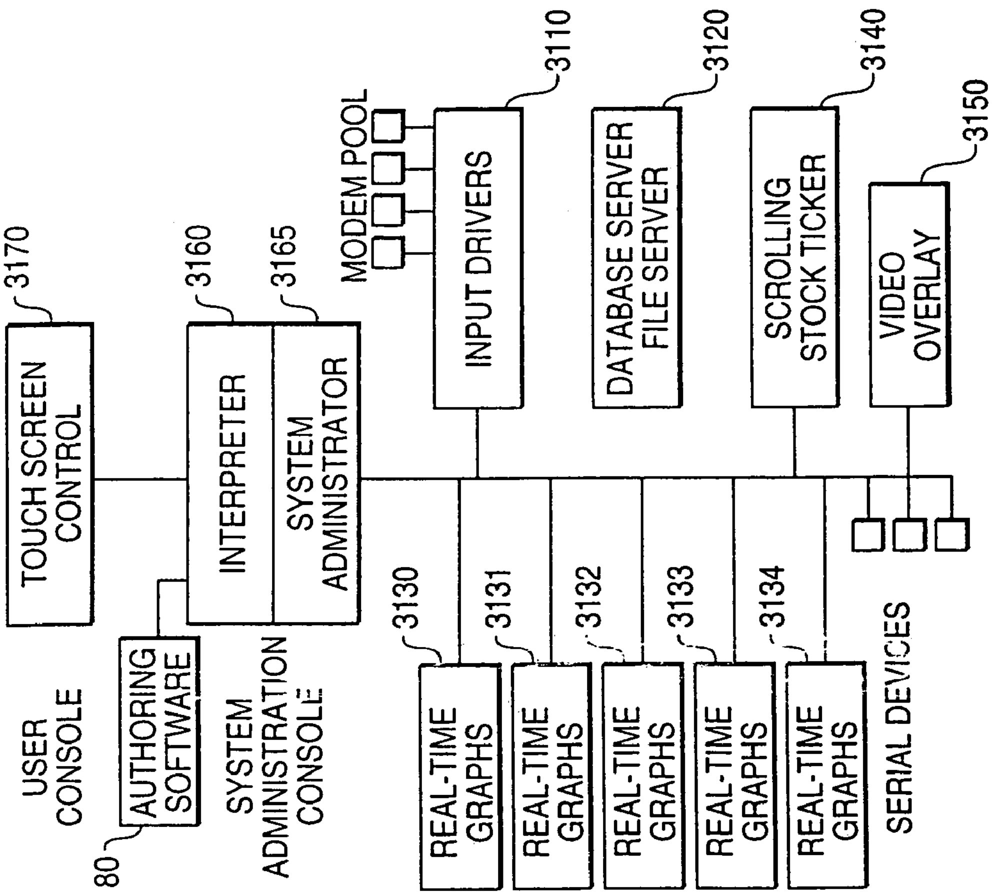
FIG. 31 is a block diagram of different software processes to drive the system of FIG. 20.

FIG. 31 shows a block diagram of different software processes to support the video wall system of this invention. Input drivers 3110 and file servers 3120 preferably reside in database server 2210. The functions of input drivers 3110—receiving, filter, formatting, and storing input data—have been described above. Database and file servers 3120 provide access to databases and files and preferably have a front end driver for local data, for example, from daily activities such as the visit of a CEO. The front end drivers allow a system administrator to maintain local data. Database and file servers 3120 also contain specific events, or triggers, that master control computer system 2280 monitors to change the displays as described above.

Real-time graph applications 3130-3134 reside on display data processors 2230-2239 and generate the two-dimensional and two and a half-dimensional charts and graphs shown in FIG. 1. Applications 3130-3136 preferably fetch current and historical data from data server 2210 and format that data into the appropriate form.

Scrolling stock ticker application 3140 fetches current securities trade information and bit maps of the corporate logos from database server 2210 and forms a ticker image. A stock ticker then appears to scroll across multiple monitors as described above.

Video overlay application 3150 combines analog video signals, such as live television or LDP (laser disk player), with computer-generated graphics. This program preferably resides on display data processors 2230-2239.

[A device control server 3155 controls serial devices 3156, 3157,3158. It operates similarly to device control server 2550 described above.]

A master control/script interpreter 3160 on master control computer system 2280 drives the entire system in real time. In the default mode, interpreter 3160 determines the order of the displays on the different areas of video wall 2250 based on pre-authored scripts. In the interactive mode, interpreter 3060 plays back pre-authored scripts based on inputs from a user or system administrator 3065.

System administrator process 3165, also on master control computer system 2280, performs several functions, such as accessing system data from data server 2210. That system data includes trigger information indicating which data system administrator 3165 should check to see whether an "event" has occurred. Examples of events are an IPO or a new high for a stock or for an index. When an event occurs, system administrator 3165 notifies interpreter 3160 to cause the playback of an associated script.

Touch screen control software 3170 on user input station 2290 allows a nontechnical user to play pre-authored scripts. Such users could select from a collection of icons or text descriptions of the scripts using a touch screen as an input device. Other input devices may also provide user inputs.

Authoring software 3180 allows users to author scripts. A script is a list of instructions that drive the hardware. Scripting languages are similar to programming languages but contain instructions specific to multimedia software development. For example, the following two instructions:

| | | |
|---|---|---|
| LDP1 | SRCH | 1023 |
| LDP1 | PLAY | |

cause a laser disk drive attached to port 1 to search for frame 1023, and then start to play that drive. Similar instructions provide high-level control of all hardware in the system, including video routers and video wall processors, and software, such as the scrolling stock ticker or real time graphs.

Instead of entering scripts manually, a GUI may be provided to generate scripts. Furthermore, the software preferably provides a real-time interface so technical personnel can control the system without generating a script.

When using the system in FIGS. 25 through 30, the software can be slightly different. For example, the VIP console 2531 preferably runs a GUI-based touch screen application that allows a particular user to present market-related graphs on video wall 2250. On the other hand, the SYSOP console 2532 preferably includes four GUI-based applications. These include the Wall State Editor, which allows editing of the current state of the wall, the Wall Schedule Editor, which allows one to change the basic schedule, the Script Editor, which also allows changing of the script, and the System Monitor which allows the system operator to view signals from different portions of the system.

Each display controller 2510 runs an application that is responsible for creating the charts in response to live data. Display controllers 2510 display these charts based on command from the application running on the master controller 2525. Each display controller 2510 includes three basic types of software modules. One is the specific graph modules which correspond to each chart. Another is a data retrieval module which gets data from the data services system 2540 and provides it to the chart being rendered. A third is the client control application that receives commands from the application running on the master control in system 2525.

The graphics modules provide renderings, animations, transitions, and video/audio control. The data retrieval module provides data query, data caching, and specific data handling functions. The client control module has the slave-to-master control systems, procedures for accepting synchronization scheduling signals, and IPC handling.

Finally, there are system-specific modules such as communications modules, systems modules, and production and testing modules. The communications modules allow communication over the different local area networks, monitoring, and specific feed accesses. The system modules provide fault tolerance, error handling, ULTRAMAX drivers, and back-up systems. The production testing modules include graphics, generation tools, animation tools and multimedia tools.

V. CONCLUSION

Figure 32:
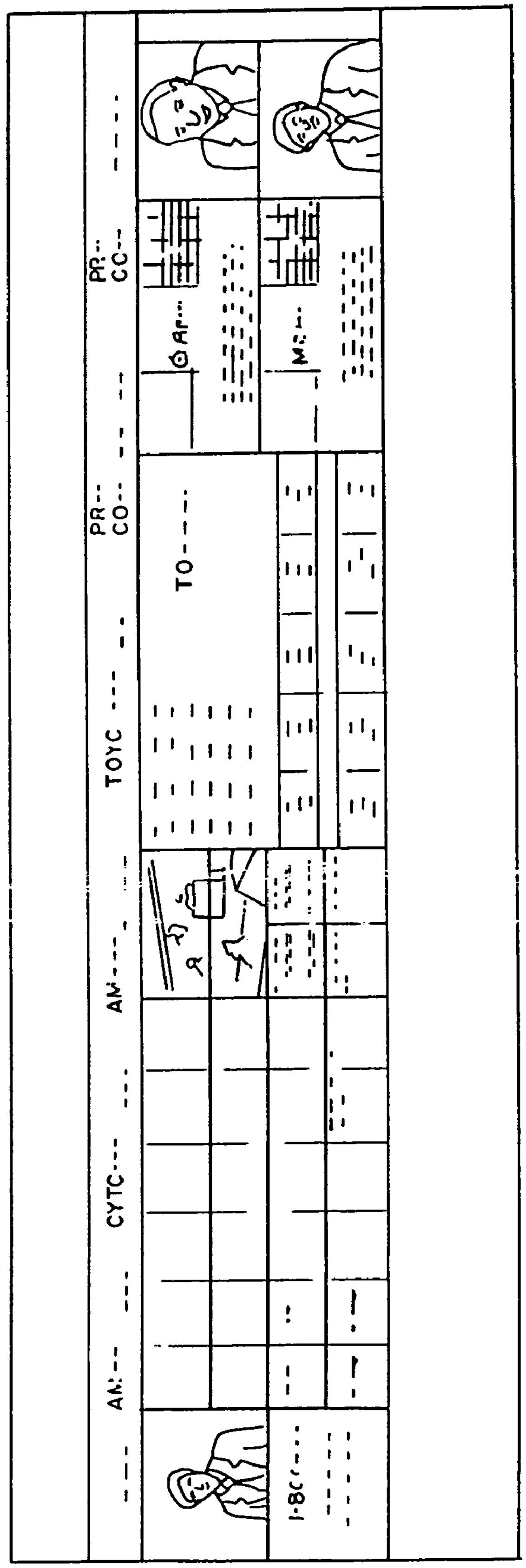
FIG. 32 is a picture of a different display on the video wall.

This description of preferred embodiment of this invention provides an illustration of the inventive concepts. It is not intended to contain an exhaustive description of all embodiments of the invention or to limit the invention to the precise form disclosed. One may modify and vary the invention in light of the teachings in this specification without departing from the scope of the invention. For example, the displays on the video wall can be different, such as in FIG. 32. The scope of the invention is defined by the appended claims and their equivalents.

What is claimed is:

1. A system comprising:

an input port to receive a first data feed that includes financial instrument identifiers and corresponding values of financial instruments;

a filter to extract from the first data feed the financial instrument identifiers and corresponding values of the financial instruments;

a database that stores graphics that represent entities whose financial instruments are identified by the financial instrument identifiers in the first data feed, accessed by financial instrument identifiers to provide graphic logos corresponding to the financial instrument identifiers in the feed; and a processor and a memory storing a program that produces a second data feed comprising values of the financial instruments and graphic logos corresponding to the financial instrument identifiers.

2. The system of claim 1 wherein the second data feed has a current trading price of the financial instruments juxtaposed with the corresponding graphics associated with the financial instrument identifiers.

3. The system of claim 2 wherein the graphics include a company or corporate logo.

4. The system of claim 1 wherein the system further comprises:

a display controller for forming display signals from the second data feed; and a monitor associated with the display controller receiving the display signals to render the graphic symbols and values corresponding to the financial instruments in the first data feed on the monitor.

5. The system of claim 4 wherein the system processes the display signals such that the monitor displays a moving ticker display of corporate logos and values of trades in stocks.

6. The system of claim 1 wherein the values include the current trading price of the stocks.

7. A display device rendering a data feed, the display device comprising:

a processor and a computer program stored on a computer readable medium to render a data feed, the data feed including:

graphics that represent entities associated with financial instruments and corresponding values of financial instruments associated with the graphics rendered in juxtaposition on the display with the data feed being dynamically rendered as a moving financial ticker on the display, with the data feed being a stock ticker feed, and the financial instruments being stocks, and the graphics being corporate logos that represent entities associated with financial instruments in the data feed.

8. The data display of claim 7 wherein the corresponding values of financial instruments associated with the graphics in the data feed include the current trading price of the stocks.

9. A computer implemented method comprising:

receiving a feed containing identifiers and corresponding values of financial instruments;

extracting from the feed the identifiers and corresponding values of the financial instruments; and dynamically displaying on a monitor, as a moving financial ticker, graphic symbols juxtaposed with value information for financial instruments, wherein dynamically displaying provides the ticker rendered across a portion of a display with the graphic symbols including logos of entities associated with the extracted identifiers.

10. The method of claim 9 wherein dynamically displaying comprises:

using the extracted financial instrument identifiers to find the logos.

11. The method of claim 9 wherein dynamically displaying comprises:

forming a display signal with the logos and values corresponding to the financial instruments in the feed; and displaying the logos and values corresponding to the financial instruments in the feed on the monitor.

12. The method of claim 9 wherein the monitor displays a moving ticker display of corporate logos and values of trades in stocks.

13. A computer-implemented method, the method comprising:

receiving a feed comprising company logos and real-time textual data corresponding to the company logos; and displaying market data as a financial instrument ticker moving across an electronic monitor, the ticker including company logos juxtaposed with real-time textual data of values of financial instruments of companies corresponding to the company logos.

14. The method of claim 13 wherein the financial information includes identifiers to access bit maps corresponding to the company logos.

15. The method of claim 13 further comprising updating data on the financial instrument ticker in accordance with current market conditions.

16. The method of claim 13 wherein the market data corresponds to trades in financial instruments and the company logos are associated with the financial information corresponding to a market price for the financial instrument.

* * * * *